United States Patent
Yan et al.

(10) Patent No.: US 10,548,018 B2
(45) Date of Patent: Jan. 28, 2020

(54) RESOURCE ALLOCATION INDICATION METHOD, DEVICE, AND SYSTEM

(71) Applicant: Huawei Technologies Co., Ltd., Shenzhen (CN)

(72) Inventors: Zhiyu Yan, Shenzhen (CN); Lei Guan, Beijing (CN); Sha Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/148,147

(22) Filed: Oct. 1, 2018

(65) Prior Publication Data
US 2019/0037410 A1    Jan. 31, 2019

Related U.S. Application Data

(63) Continuation of application No. PCT/CN2016/082095, filed on May 13, 2016.

(30) Foreign Application Priority Data

Apr. 1, 2016    (WO) ................ PCT/CN2016/078367

(51) Int. Cl.
| | |
|---|---|
| *H04W 16/10* | (2009.01) |
| *H04W 72/02* | (2009.01) |
| *H04W 16/14* | (2009.01) |

(52) U.S. Cl.
CPC ........... *H04W 16/10* (2013.01); *H04W 72/02* (2013.01); *H04W 16/14* (2013.01)

(58) Field of Classification Search
CPC ..... H04W 16/10; H04W 16/14; H04W 16/02; H04W 16/04; H04W 16/06; H04W 16/08; H04W 72/02; H04W 72/04; H04W 72/00
See application file for complete search history.

(56) References Cited

U.S. PATENT DOCUMENTS

| | | |
|---|---|---|
| 2012/0087331 A1 | 4/2012 | Seo et al. |
| 2012/0120888 A1 | 5/2012 | Miao et al. |
| 2015/0181589 A1 | 6/2015 | Luo et al. |

FOREIGN PATENT DOCUMENTS

| | | |
|---|---|---|
| CN | 101080081 A | 11/2007 |
| CN | 101657018 A | 2/2010 |

(Continued)

OTHER PUBLICATIONS

Mediatek Inc., Considerations on PUSCH for LAA, 3GPP TSG RAN WG1 Meeting #84, St. Julian's, Malta, R1-160972, Feb. 15-19, 2016.

(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

A resource allocation indication method, a device, and a system are provided. The method includes: obtaining, by a terminal device, first indication information; and determining, by the terminal device, a target resource based on the first indication information, and sending uplink data on the target resource, where the target resource includes a resource block in M basic resource units that is allocated to the terminal device; a position of an allocated resource block in each of the M basic resource units corresponds to a first frequency domain position of a resource block in a first resource block set; the first frequency domain position is a frequency domain position obtained after a second frequency domain position of a resource block in a second resource block set is shifted; and the M basic resource units are arranged in ascending order in frequency domain.

20 Claims, 9 Drawing Sheets

(56) References Cited

FOREIGN PATENT DOCUMENTS

| CN | 101778394 A | 7/2010 |
|---|---|---|
| CN | 101945484 A | 1/2011 |
| CN | 102036387 A | 4/2011 |
| EP | 2439995 A2 | 4/2012 |
| JP | 2008172356 A | 7/2008 |

OTHER PUBLICATIONS

"Discussion on PUSCH design for eLAA UL," 3GPP TSG RAN WG1 Meeting #84bis, R1-162799, Busan, Korea, pp. 1-4, 3GPP—3rd Generation Partnership Project—Valbonne, France (Apr. 11-15, 2016).

"PUSCH transmission for eLAA," 3GPP TSG RAN WG1 Meeting #84, R1-160300, St. Julian's, Malta, pp. 1-7, 3GPP—3rd Generation Partnership Project—Valbonne, France (Feb. 15-19, 2016).

"3rd Generation Partnership Project; Technical specification Group Radio Access Network; Evolved Universal Terrestrial Radio Access (E-UTRA); Physical layer procedures (Release 13)," 3GPP TS 36.213 V13.1.1, pp. 1-361, 3GPP—3rd Generation Partnership Project—Valbonne, France (Mar. 2016).

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.1.0, pp. 1-129, 3GPP—3rd Generation Partnership Project—Valbonne, France (Mar. 29, 2016).

Three first-type resource block sets in a reference resource block set group

RESOURCE ALLOCATION INDICATION METHOD, DEVICE, AND SYSTEM

CROSS-REFERENCE TO RELATED APPLICATIONS

This application is a continuation of International Application No. PCT/CN2016/082095, filed on May 13, 2016, which claims priority to International Application No. PCT/CN2016/078367, filed on Apr. 1, 2016. The disclosures of the aforementioned applications are hereby incorporated by reference in their entireties.

TECHNICAL FIELD

Embodiments of the present invention relate to the field of wireless communications technologies, and in particular, to a resource allocation indication method, a device, and a system.

BACKGROUND

In a Long Term Evolution (LTE) system, a base station schedules a terminal device to send uplink data on an unlicensed spectrum resource. The base station sends scheduling information such as resource allocation information or a modulation and coding scheme to the terminal by using a control channel, so that the terminal device receives downlink data or sends uplink data after detecting the scheduling information carried on the control channel. When the terminal device sends data, a resource block (RB) is used as a resource scheduling unit for scheduling and allocation. When the base station allocates a channel resource to the terminal device, generally, the base station allocates one RB or a plurality of consecutive RBs in frequency domain to one UE, or allocates two nonconsecutive RB sets in frequency domain to one UE. Each RB set includes one RB or a plurality of consecutive RBs in frequency domain. However, when the terminal device sends data on the unlicensed spectrum resource, a limiting condition specified for an unlicensed spectrum needs to be satisfied: transmit power of the terminal device within each megahertz (MHz) cannot exceed 10 decibel-milliwatt (dBm for short) or 7 dBm. Therefore, in an existing resource allocation manner, total transmit power of the terminal device is limited by a quantity of consecutive RBs in frequency domain that are allocated to the terminal device, leading to smaller coverage of the unlicensed spectrum.

In an existing mechanism, to satisfy the foregoing limiting condition and ensure that the coverage of unlicensed spectrum does not become smaller, the base station allocates at least two nonconsecutive resource block sets within an uplink carrier bandwidth to the terminal device, so that when the terminal device can send uplink data by using each resource block set, maximum transmit power under the foregoing limiting condition can be achieved to some extent, and the coverage of the unlicensed spectrum is extended.

However, when a resource is indicated to the terminal device, according to current regulations on the unlicensed spectrum, the base station does not support indication of specific resource information of nonconsecutive resource block sets to the terminal device. The base station can indicate only information about a resource block in a first resource set within a bandwidth to the terminal device, and allocate by default interlaced resource blocks that belong to a same row as the resource block to the terminal device. In addition, the conventional art is inapplicable to frequency division multiplexing of an uplink resource in the unlicensed spectrum between a plurality of terminal devices.

SUMMARY

Embodiments of the present invention provide a resource allocation indication method, a device, and a system, to resolve a prior-art problem that details about resource allocation in an unlicensed spectrum cannot be indicated to a terminal device.

A first aspect of the embodiments of the present invention provides a resource allocation indication method. The method includes:

sending, by a terminal device, a resource request to an access network device, and obtaining, by the terminal device, first indication information sent by the access network device; and determining, by the terminal device, a target resource based on the first indication information, and sending uplink data on the target resource, where the target resource includes a resource block in M basic resource units that is allocated to the terminal device; a position of an allocated resource block in each of the M basic resource units corresponds to a first frequency domain position of a resource block in a first resource block set; and the first frequency domain position of the resource block in the first resource block set is a frequency domain position obtained after a second frequency domain position of a resource block in a second resource block set is shifted, where M is a positive integer. A resource position of the target resource used to send the uplink data is accurately obtained.

Optionally, the shift is a cyclic shift, and the first indication information satisfies one of the following:

the first indication information is used to indicate the second frequency domain position of the resource block in the second resource block set and a shift value T of the cyclic shift, where T is an integer; and the first indication information is used to indicate the first frequency domain position of the resource block in the first resource block set. Therefore, the terminal device can accurately determine the resource position of the target resource, thereby reducing a calculation time.

In some possible designs, the first resource block set satisfies:

a frequency domain position of a $k^{th}$ resource block in the first resource block set corresponds to frequency domain positions of M resource blocks; and an $m^{th}$ resource block corresponding to the frequency domain position $f_k$ of the $k^{th}$ resource block in the first resource block set is a resource block whose frequency domain position is $(f_k+\Delta_m)$ in an $m^{th}$ basic resource unit in the M basic resource units, where $\Delta_m$ is a resource mapping reference value corresponding to the $m^{th}$ basic resource unit, k and m are both positive integers, $\Delta_m$ is an integer, $1<k\leq K$, $1<m\leq K$, and K is a quantity of resource blocks included in one basic resource unit.

Optionally, when $(f_k+\Delta_m)>K$, a resource block that is in the $m^{th}$ basic resource unit and that corresponds to the frequency domain position $f_k$ of the $k^{th}$ resource block in the first resource block set is a resource block corresponding to a frequency domain position obtained after a cyclic shift is performed on the frequency domain position $(f_k+\Delta_m)$ in the $m^{th}$ basic resource unit.

In some possible designs, the first resource block set satisfies:

a frequency domain position of an $x^{th}$ resource block in the first resource block set corresponds to frequency domain positions of M resource blocks; and the M resource blocks include resource blocks that are in the M basic resource units and whose frequency domain positions are the same as the frequency domain position of the $x^{th}$ resource block, where each of the M basic resource units has one resource block, x is a positive integer, and $1<x\leq K$.

When a limiting condition for power spectrum density is satisfied, transmit power of the terminal device is improved.

In some possible designs, a reference resource set group is preconfigured on both a terminal device side and an access network device side and is used to determine, by the terminal device, the target resource used to send the uplink data; the reference resource block set group includes at least one reference resource block set; the second resource block set is a first-type resource block set in the reference resource block set group; the first-type resource block set includes L resource block groups; the resource block group includes one resource block or includes at least two resource blocks that are adjacent to each other in frequency domain; and the L resource block groups are non-adjacent to each other in frequency domain;

a frequency domain position of a first resource block in a $V1^{th}$ resource block group in the L resource block groups corresponds to a $$\left(\frac{K(V1-1)}{L}+1\right)^{th}$$

resource block in one basic resource unit, where $1\leq V1\leq P1$; and a frequency domain position of a first resource block in a $V2^{th}$ resource block group in the L resource block sets corresponds to a $$\left(\frac{K(V2-1)}{L}+2\right)^{th}$$

resource block in one basic resource unit, where $P1+1\leq V2\leq L$; and

L, P1, P2, V1, V2, and K are all positive integers, $L\geq 2$, $P1\geq 1$, $P2=L-P1$, and K is a quantity of resource blocks included in one basic resource unit. Accuracy of determining the target resource by the terminal device can be improved, and a time of calculating the resource position can be reduced.

In some possible designs, for the first resource block set, the L resource block groups further satisfy: in ascending order in frequency domain, a quantity of resource blocks included in each of the first P1 resource block groups in the L resource block groups is M1, and a quantity of resource blocks included in each of the last P2 resource block groups in the L resource block groups is M2, where $M_1>M_2$, and M1 M2 are both positive integers. The quantities of resource blocks included in the L resource block groups are made to be the same as far as possible, so that a peak-to-average ratio of uplink information sent by the terminal device can be as low as possible, thereby improving sending efficiency of the terminal device.

In some possible designs, if a total quantity of resource blocks included in the L resource block groups is an odd number, $M_1-M_2=1$. A difference between the quantities of resource blocks included in the L resource block groups is minimized, so that allowed maximum transmit power of sending by the terminal device is not limited by a resource block group including a relatively large quantity of resource blocks.

In some possible designs, when the first resource block set is a first-type resource block set, the shift value T of the cyclic shift is any one in a set $[0,1,\ldots l_1]$ or any one in a set $$[l_2, l_2+1, \ldots l_3], \text{ where } l_1 = \frac{K}{L} - M_2 - 1, l_2 = \frac{K}{L} - 1, \text{ and } l_3 = K - M_1;$$

and the shift value T1 is a cyclic shift on resource block groups that are sorted in ascending order in frequency domain. A beneficial effect is as follows: The shift value T is a value within a range of the set, so as to ensure there are still L resource block groups formed after a cyclic shift is performed on a resource block in the L resource block groups.

In some possible designs, considering that some resource blocks remain when resource blocks in a same basic resource unit are allocated to only one terminal device, the remaining resource blocks may be allocated to another terminal device, thereby implementing frequency division multiplexing of a resource between a plurality of terminal devices. Details may be as follows: The reference resource block set group configured on a second terminal device side may further include a second-type resource block set; the second-type resource block set includes L resource block groups; the resource block group includes one resource block or includes at least two resource blocks that are adjacent to each other in frequency domain; and the L resource block groups are non-adjacent to each other in frequency domain; and the second-type resource block set includes the L resource block groups; and a frequency domain position of a first resource block in a $V3^{th}$ resource block group in the L resource block groups corresponds to a $$\left(\frac{K(V3-1)}{L}+1\right)^{th}$$

resource block in one basic resource unit, where $1\leq V3\leq L$; and $L\geq 2$, and K is a quantity of resource blocks included in one basic resource unit. Frequency division multiplexing between a plurality of terminal devices is implemented.

In some possible designs, the second-type resource block set satisfies one of two cases a and b:

a. A quantity of resource blocks included in each of the first P3 resource block groups in the L resource block groups included in the second-type resource block set is $M_3$; and a quantity of resource blocks included in each of the last P4 resource block groups in the L resource block groups is $M_4$, where M3 and M4 are both positive integers, $P3\geq 3$, $P4=L-P3$, and $M_3>M_4$. The quantities of resource blocks included in the L resource block groups are made to be the same as far as possible, so that a peak-to-average ratio of uplink information sent by the terminal device can be as low as possible, thereby improving sending efficiency of the terminal device.

Optionally, a shift value T of a cyclic shift corresponding to the second-type resource block set satisfies:

the shift value T2 is any one in a set [0,1, ... $l_1$] or any one in a set [$l_2$, $l_2$+1, ... $l_3$], where $$l_1 = \frac{K}{L} - M_4, \; l_2 = \frac{K}{L}, \text{ and } l_3 = K - M_3.$$

The cyclic shift is a cyclic shift in ascending order in frequency domain. Resource block allocation uniformity can be ensured, and it can be further ensured that the resource blocks in the L resource block groups are not dispersed.

b. A quantity of resource blocks included in each of the L resource block groups is $M_5$, and a shift value T of a cyclic shift corresponding to the second-type resource block set satisfies:

the shift value T2 is any one in a set [0,1, ... $l_1$], where $$l_1 = \frac{K}{L} - M_5,$$

and $M_5$ is a positive integer.

The cyclic shift is a cyclic shift in ascending order in frequency domain. The shift value T is a value within a range of the set, so as to ensure different resource block sets are formed after a cyclic shift is performed on a resource block in the L resource block groups.

In some possible designs, when a quantity $O_1$ of resource blocks in the second resource block set satisfies $$O_1 \geq \frac{K}{2} + 1,$$

there is only one shift value of a cyclic shift corresponding to the second resource block set; and/or when a quantity $O_1$ of resource blocks in the second resource block set is an odd number, there is only one shift value of a cyclic shift corresponding to the second resource block set, where $O_1$ is a positive integer, and K is a quantity of resource blocks included in one basic resource unit.

In some possible designs, a relationship between the first resource block set and the M basic resource units is as follows:

a frequency domain position of a $t1^{th}$ resource block in the first resource block set corresponds to a $U_1^{th}$ resource block in one basic resource unit; a frequency domain position of a $t2^{th}$ resource block in the second resource block set corresponds to a $U_2^{th}$ resource block in the $i^{th}$ basic resource unit; and it is satisfied that $U_1$=mod(t1, K) and $U_2$=mod($U_1$+T, K), where T is a shift value of the cyclic shift, K is a quantity of resource blocks included in one basic resource unit, and t1, t2, $U_2$, and T are positive integers greater than 0. Provided that the terminal device learns of an allocated resource block in one basic resource unit, that is, a frequency domain position of the first resource block set, the terminal device can calculate a frequency domain position of an allocated resource block in another basic resource unit according to a preset rule, thereby effectively reducing calculation steps to be performed by the terminal device, improving accuracy of determining a resource position, and reducing power consumption of the terminal device to some extent.

An embodiment provided according to a second aspect below is mainly described from a perspective of an access network device.

The second aspect provides a resource allocation indication method. The method includes:

sending, by an access network device, first indication information to a terminal device; and receiving, by the access network device on a target resource corresponding to the first indication information, uplink data sent by the terminal device, where the target resource includes a resource block in M basic resource units that is allocated to the terminal device; a position of an allocated resource block in each of the M basic resource units corresponds to a first frequency domain position of a resource block in a first resource block set; the first frequency domain position of the resource block in the first resource block set is a frequency domain position obtained after a second frequency domain position of a resource block in a second resource block set is shifted, where M is a positive integer; and the M basic resource units are arranged in ascending order in frequency domain. In this way, the terminal device can determine positions of M resource blocks based on a position of one resource block in the first resource block set, without requiring the access network device to indicate the position of the allocated resource block in each of the M basic resource units to the terminal device, thereby improving efficiency of indicating information by the access network device.

In some possible designs, the shift is a cyclic shift, and the first indication information satisfies one of the following:

the first indication information is used to indicate, to the terminal device, the second frequency domain position of the resource block in the second resource block set and a shift value T1 of the cyclic shift; and the first indication information is used to indicate the first frequency domain position of the resource block in the first resource block set.

In some possible designs, the first resource block set satisfies:

a frequency domain position of a $k^{th}$ resource block in the first resource block set corresponds to frequency domain positions of M resource blocks; and an $m^{th}$ resource block corresponding to the frequency domain position $f_k$ of the $k^{th}$ resource block in the first resource block set is a resource block whose frequency domain position is $(f_k+\Delta_m)$ in an $m^{th}$ basic resource unit in the M basic resource units, where $\Delta_m$ is a resource mapping reference value corresponding to the $m^{th}$ basic resource unit, k and m are both positive integers, $\Delta_m$ is an integer, 1<k≤K, 1<m≤K, and K is a quantity of resource blocks included in one basic resource unit.

Optionally, when $(f_k+\Delta_m)$>K, a resource block that is in the $m^{th}$ basic resource unit and that corresponds to the frequency domain position $f_k$ of the $k^{th}$ resource block in the first resource block set is a resource block corresponding to a frequency domain position obtained after a cyclic shift is performed on the frequency domain position $(f_k+\Delta_m)$ in the $m^{th}$ basic resource unit.

In some possible designs, the first resource block set satisfies:

a frequency domain position of an $x^{th}$ resource block in the first resource block set corresponds to frequency domain positions of M resource blocks; and the M resource blocks include resource blocks that are in the M basic resource units and whose frequency domain positions are the same as the frequency domain position of the $x^{th}$ resource block, where each of the M basic resource units has one resource block, x is a positive integer, and 1<x≤K.

The target resource satisfies:

the target resource includes a resource block corresponding to a frequency domain position of each resource block in the first resource block set, and the resource block corresponding to the frequency domain position $f_k$ of the $k^{th}$ resource block in the first resource block set is a resource block that is in each of the M basic resource units and whose frequency domain position is $f_k$.

In some possible designs, the second resource block set is a first-type resource block set in a reference resource block set group; the reference resource block set group includes at least one reference resource block set; the first-type resource block set includes L resource block groups; the resource block group includes one resource block or includes at least two resource blocks that are adjacent to each other in frequency domain; and the L resource block groups are non-adjacent to each other in frequency domain;

a frequency domain position of a first resource block in a $V1^{th}$ resource block group in the L resource block groups corresponds to a $$\left(\frac{K(V1-1)}{L}+1\right)^{th}$$

resource block in one basic resource unit, where $1 \le V1 \le P1$; and a frequency domain position of a first resource block in a $V2^{th}$ resource block group in the L resource block sets corresponds to a $$\left(\frac{K(V2-1)}{L}+2\right)^{th}$$

resource block in one basic resource unit, where $P1+1 \le V2 \le L$; and

L, P1, P2, V1, V2, and K are all positive integers, $L \ge 2$, $P1 \ge 1$, $P2 = L - P1$, and K is a quantity of resource blocks included in one basic resource unit. Based on positions of resource blocks in the first-type resource block set, when quantities of resource blocks included in the L resource block groups are different, a frequency resource can be effectively multiplexed with another terminal device.

In some possible designs, for the first-type resource block set, the L resource block groups further satisfy: in ascending order in frequency domain, a quantity of resource blocks included in each of the first P1 resource block groups in the L resource block groups is $M_1$, and a quantity of resource blocks included in each of the last P2 resource block groups in the L resource block groups is $M_2$, where $M_1 > M_2$, and M1 and M2 are both positive integers. The quantities of resource blocks included in the L resource block groups are made to be the same as far as possible, so that a peak-to-average ratio of uplink information sent by the terminal device can be as low as possible, thereby improving sending efficiency of the terminal device.

In some possible designs, according to a data volume requirement of the terminal device, if a total quantity of resource blocks included in the L resource block groups is an odd number, $M_1 - M_2 = 1$. A difference between the quantities of resource blocks included in the L resource block groups is minimized, so that allowed maximum transmit power of sending by the terminal device is not limited by a resource block group including a relatively large quantity of resource blocks.

In some possible designs, when the first resource block set is a first-type resource block set, the shift value T1 of the cyclic shift satisfies:

the shift value T1 is any one in a set $[0, 1, \ldots l_1]$ or any one in a set $[l_2, l_2+1, \ldots l_3]$, where $$l_1 = \frac{K}{L} - M_2 - 1, l_2 = \frac{K}{L} - 1, \text{ and } l_3 = K - M_1.$$

The shift is a cyclic shift in ascending order in frequency domain. Accuracy of determining the target resource by the terminal device can be improved, and a time of calculating the resource position can be reduced.

In some possible designs, when allocating a resource to a plurality of terminal devices, the access network device may allocate a resource block in one basic resource unit to the plurality of terminal devices, thereby implementing frequency division multiplexing between the plurality of terminal devices and improving resource utilization. The access network device may configure a plurality of types of resource block sets in the reference resource block set group, and may further combine some types of resource block sets in the present invention with some types of resource block sets in an existing mechanism, to ensure non-overlapping between resource blocks of the terminal devices, and allocate as many resource blocks as possible in an entire basic resource unit, thereby implementing frequency division multiplexing. Details are as follows:

The access network device allocates the target resource in the M basic resource units to another terminal device, and sends second indication information to the terminal device, so that resources allocated to the two terminal devices are non-overlapping in frequency domain, thereby implementing frequency division multiplexing and improving cell coverage and resource utilization.

In some possible designs, a second terminal device may use some types of resource block sets in the present invention, for example, the foregoing first-type resource block set, or may use some types of resource block sets in an existing mechanism in a combined manner, for example, use a second-type resource block set in the reference resource block set. The second-type resource block set satisfies:

the second-type resource block set includes L resource block groups; the resource block group includes one resource block or includes at least two resource blocks that are adjacent to each other in frequency domain; and the L resource block groups are non-adjacent to each other in frequency domain; and a frequency domain position of a first resource block in a $V3^{th}$ resource block group in the L resource block groups corresponds to a $$\left(\frac{K(V3-1)}{L}+2\right)^{th}$$

resource block in the $i^{th}$ basic resource unit, where $1 \le V3 \le L$; and $L \ge 2$, and K is a quantity of resource blocks included in the $i^{th}$ basic resource unit.

In some possible designs, the second-type resource block set is described based on two cases a and b:

a. The L resource block groups satisfy:

a quantity of resource blocks included in each of the first P3 resource block groups in the L resource block groups is $M_3$, and a quantity of resource blocks included in each of the last P4 resource block groups in the L resource block groups is $M_4$, where M3 and M4 are both positive integers, $P3 \ge 3$, P4=L−P3, and $M_3 > M_4$ The quantities of resource blocks included in the L resource block groups are made to be the same as far as possible, so that a peak-to-average ratio of uplink information sent by the terminal device can be as low as possible, thereby improving sending efficiency of the terminal device.

Optionally, when the second resource block set is the second-type resource block set, the shift value T2 of the cyclic shift may satisfy:

the shift value T2 is any one in a set $[0,1, \ldots l_1]$ or any one in a set $[l_2, l_2+1, \ldots l_3]$, where $$l_1 = \frac{K}{L} - M_4, l_2 = \frac{K}{L}, \text{ and } l_3 = K - M_3.$$

The cyclic shift is a cyclic shift in ascending order in frequency domain. The shift value T is a value within a range of the set, so as to ensure there are still L resource block groups formed after a cyclic shift is performed on a resource block in the L resource block groups.

b. A quantity of resource blocks included in each of the L resource block groups is $M_5$; and when the second resource block set is the second-type resource block set, the shift value T of the cyclic shift is any one in a set $[0,1, \ldots l_1]$, where $$l_1 = \frac{K}{L} - M_5,$$

and $M_5$ is a positive integer.

The cyclic shift is a cyclic shift in ascending order in frequency domain. The shift value T is a value within a range of the set, so as to ensure there are still L resource block groups formed after a cyclic shift is performed on a resource block in the L resource block groups.

In some possible designs, when a quantity $O_1$ of resource blocks in the second resource block set satisfies $$O_1 \geq \frac{K}{2} + 1,$$

there is only one shift value of a cyclic shift corresponding to the second resource block set; and/or when a quantity $O_1$ of resource blocks in the second resource block set is an odd number, there is only one shift value of a cyclic shift corresponding to the second resource block set, where $O_1$ is a positive integer, and K is a quantity of resource blocks included in one basic resource unit.

In some possible designs, a relationship between the first resource block set and the M basic resource units is as follows:

a frequency domain position of a $t^{th}$ resource block in the first resource block set corresponds to a $U_1^{th}$ resource block in one basic resource unit; a frequency domain position of a $t^{th}$ resource block in the second resource block set corresponds to a $U_2^{th}$ resource block in the $i^{th}$ basic resource unit; and it is satisfied that $U_1 = \mod(t1, K)$ and $U_2 = \mod(U_1 + T, K)$, where T is a shift value of the cyclic shift, K is a quantity of resource blocks included in one basic resource unit, and t1, t2, $U_2$, and T are positive integers greater than 0. Provided that an allocated resource block in one basic resource unit, that is, the first resource block set, is indicated, the terminal device can calculate a frequency domain position of an allocated resource block in another basic resource unit according to a preset rule, thereby effectively reducing calculation steps to be performed by the terminal device, improving accuracy of determining a resource position, and reducing power consumption of the terminal device to some extent.

A third aspect of the embodiments of the present invention provides a terminal device having a function of implementing the corresponding resource allocation indication method according to the first aspect. The function may be implemented by hardware, or may be implemented by executing corresponding software by hardware. The hardware or software includes one or more modules corresponding to the foregoing function. The module may be software and/or hardware.

In a possible design, the terminal device includes:

a receiving module, configured to obtain first indication information; and a processing module, configured to: determine a target resource based on the first indication information, and send uplink data on the target resource, where the target resource includes a resource block in M basic resource units that is allocated to the terminal device; a position of an allocated resource block in each of the M basic resource units corresponds to a first frequency domain position of a resource block in a first resource block set; and the first frequency domain position of the resource block in the first resource block set is a frequency domain position obtained after a second frequency domain position of a resource block in a second resource block set is shifted, where M is a positive integer.

In a possible design, the terminal device includes:

a processor, a memory, a receiver, and a transmitter that are connected to each other, where the memory is configured to store program code, and the processor is configured to invoke the program code in the memory to perform the following operations:

obtaining first indication information by using the receiver; and determining a target resource based on the first indication information received by the receiver, and sending uplink data on the target resource, where the target resource includes a resource block in M basic resource units that is allocated to the terminal device; a position of an allocated resource block in each of the M basic resource units corresponds to a first frequency domain position of a resource block in a first resource block set; and the first frequency domain position of the resource block in the first resource block set is a frequency domain position obtained after a second frequency domain position of a resource block in a second resource block set is shifted, where M is a positive integer.

A fourth aspect of the embodiments of the present invention provides an access network device having a function of implementing the corresponding resource allocation indication method according to the second aspect. The function may be implemented by hardware, or may be implemented by executing corresponding software by hardware. The hardware or software includes one or more modules corresponding to the foregoing function. The module may be software and/or hardware.

In a possible design, the access network device includes:

a sending module, configured to send first indication information to a terminal device; and a receiving module, configured to receive, on a target resource corresponding to the first indication information, uplink data sent by the terminal device, where the target resource includes a resource block in M basic resource units that is allocated to the terminal device; a position of an allocated resource block in each of the M basic resource units corresponds to a first frequency domain position of a resource block in a first resource block set; and the first frequency domain position of the resource block in the first resource block set is a frequency domain position obtained after a second frequency domain position of a resource block in a second resource block set is shifted, where M is a positive integer.

In a possible design, the access network device includes:
a processor, a memory, a receiver, and a transmitter that are connected to each other, where the memory is configured to store program code, and the processor is configured to invoke the program code in the memory to perform the following operations:

sending first indication information to a terminal device by using the transmitter; and receiving, by using the receiving module on a target resource corresponding to the first indication information, uplink data sent by the terminal device, where the target resource includes a resource block in M basic resource units that is allocated to the terminal device; a position of an allocated resource block in each of the M basic resource units corresponds to a first frequency domain position of a resource block in a first resource block set; and the first frequency domain position of the resource block in the first resource block set is a frequency domain position obtained after a second frequency domain position of a resource block in a second resource block set is shifted, where M is a positive integer.

A fifth aspect of the embodiments of the present invention provides a communications system having a function of implementing the foregoing resource allocation indication method. The function may be implemented by hardware, or may be implemented by executing corresponding software by hardware. The hardware or software includes one or more modules corresponding to the foregoing function. The module may be software and/or hardware.

In a possible design, the communications system includes:
the terminal device according to the third aspect; and
the access network device according to the fourth aspect.
Compared with the conventional art, in the solutions provided in the present invention, the terminal device determines the target resource based on the first indication information, where the target resource includes an allocated resource block in the M basic resource units. Because a position of an allocated resource block in each of the M basic resource units corresponds to the first frequency domain position of the resource block in the first resource block set, details about the resource allocated to the terminal device can be indicated to the terminal device, thereby improving coverage of an unlicensed spectrum when a limiting condition for power spectrum density is satisfied.

DESCRIPTION OF EMBODIMENTS

Figure 1:
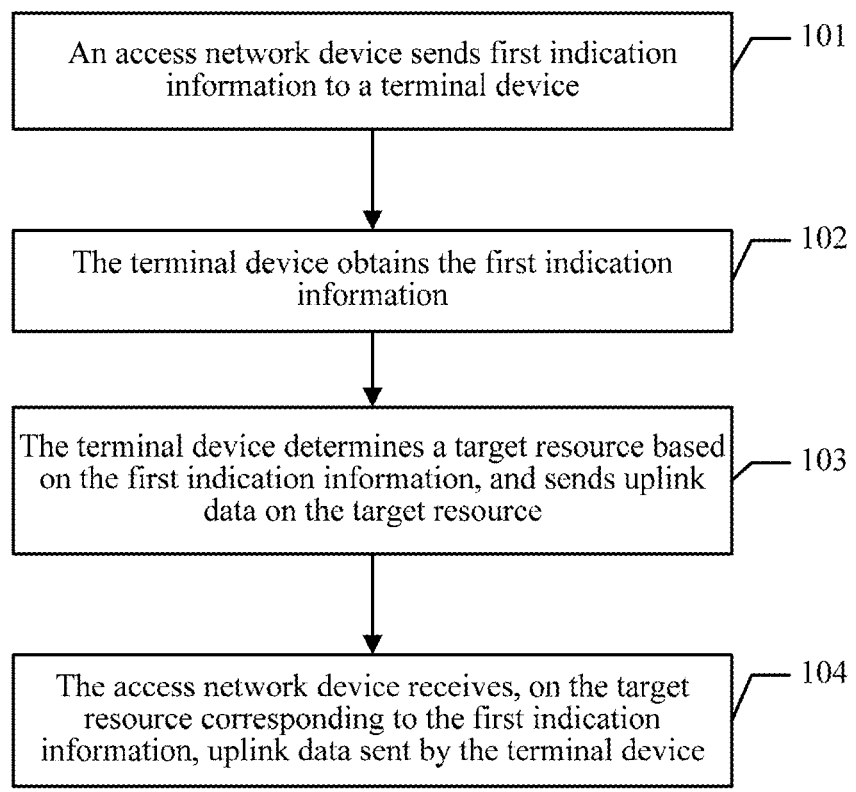
FIG. 1 is a flowchart of a resource allocation indication method according to an embodiment of the present invention.

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. The module division in this specification is merely logical division and may be other division in actual implementation. For example, multiple modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms. This is not limited in this specification. In addition, the modules or submodules described as separate parts may or may not be physically separate, may or may not be physical modules, or may be distributed on multiple circuit modules. Some or all of the modules may be selected according to actual needs to achieve the objectives of the solutions of the embodiments in the present invention.

Embodiments of the present invention provide a resource allocation indication method, a device, and a system, applied to the field of wireless communications technologies. Details are provided below.

An access network device in this specification is a device for connecting a terminal device to a wireless network, is also referred to as a base station, and includes, but is not limited to, an evolved NodeB (evolved Node Base, eNB for short), a radio network controller (RNC), a NodeB (NB for short), a base station controller (BSC), a base transceiver station (BTS), a home base station (for example, a Home evolved NodeB or a Home Node B, HNB for short), a baseband unit (BBU).

Although an LTE system is used as an example for description in the Background, a person skilled in the art should appreciate that, the present invention is not only applicable to the LTE system, but also is applicable to another wireless communications system, for example, a Global System for Mobile Communications (GSM), a Universal Mobile Telecommunications System (UMTS), a Code Division Multiple Access (CDMA) system, and a new network system. The LTE system is used as an example below to describe specific embodiments.

Particularly, it should be noted that a terminal device in the embodiments of the present invention may be a device that provides a user with voice and/or data connectivity, a handheld device having a wireless connection function, or another processing device connected to a wireless modem. A wireless terminal may communicate with one or more core networks by using a radio access network (RAN). The wireless terminal may be a mobile terminal such as a mobile phone (or referred to as a "cellular" phone) and a computer having a mobile terminal, for example, may be a portable, pocket-sized, handheld, computer built-in, or in-vehicle mobile apparatus, which exchange language and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a terminal device, a user agent, a user device, or user equipment.

According to an existing rule for an unlicensed spectrum, when indicating, to a terminal device, a resource to be allocated to the terminal device, a base station cannot clearly indicate a plurality of to-be-allocated nonconsecutive resource block groups to the terminal device. To resolve the foregoing technical problem, the embodiments of the present invention mainly provide the following technical solutions.

1. A transmission rule is preconfigured on both an access network device side and a terminal device side. The transmission rule includes selecting a resource based on a reference resource block set group.

A resource block included in a resource block set in the reference resource block set group is a virtual resource, and can be mapped to a basic resource unit. A length of any type of resource block set in the reference resource set group and a frequency domain position of an included resource block correspond to a basic resource unit in frequency domain. The reference resource block set group includes a first-type resource block set, or includes a first-type resource block set and a second-type resource block set. The first-type resource block set and the second-type resource block set both include L resource block groups, and each type of resource block set has a same feature. There may be one or more types of resource block sets in the reference resource set group. In a same type of resource block set, quantities of resource blocks included in the L resource block groups may be different. An access network device may select a matching resource block set based on an actual resource requirement of a terminal device or a frequency domain position of an idle resource block. A resource block group includes one resource block or includes at least two resource blocks that are adjacent to each other in frequency domain. The L resource block groups are non-adjacent to each other in frequency domain. For example, a length of one basic resource unit is defined as 10 resource blocks, and the reference resource set group is defined to include three A-type resource block sets. The three A-type resource block sets may all include two resource block groups: In a first A-type resource block set, a first resource block group includes two resource blocks, and a second resource block group includes one resource block; in a second A-type resource block set, a first resource block group includes three resource blocks, and a second resource block group includes two resource blocks; and in a third A-type resource block set, a first resource block includes four resource blocks, and a second resource block group includes three resource blocks.

The reference resource block set group includes the first-type resource block set and the second-type resource block set, and different types of resource block sets are allocated to two or more terminal devices, to effectively allocate different resource blocks in M basic resource units to two or more terminal devices, thereby improving spectrum utilization and cell coverage.

2. The access network device allocates a target resource to the terminal device according to a resource request of the terminal device.

3. The access network device determines a second reference resource block set that is in the reference resource block set group and that matches the target resource, and determines, based on a frequency domain position of the target resource and the second resource set, a cyclic shift of a frequency domain position of each resource block in the reference resource set.

4. The access network device sends, to the terminal device, first indication information indicating the target resource.

The first indication information indicates the reference resource set matching the target resource, and a value of a cyclic shift on a resource block in the second resource block set matching the target resource.

Referring to FIG. 1, a resource allocation indication method provided in the present invention is described below by using an example. It may be learned that, before sending first indication information, a terminal device sends a resource request to an access network device; and the access network device allocates a target resource to the terminal device, and then the access network device determines content of the first indication information indicating the target resource. The method includes the following steps.

101: The access network device sends the first indication information to the terminal device.

The first indication information is information used to indicate a second frequency domain position of a resource block in a second resource block set. For example, a frequency domain position obtained after the second frequency domain position is shifted, that is, a first frequency domain position of a resource block in a first resource block set that is finally obtained by the terminal device, may be indicated to the terminal device.

Optionally, the first indication information satisfies one of the following:

a. The first indication information is used to indicate the second frequency domain position of the resource block in the second resource block set and a shift value T of the cyclic shift, where T is an integer.

b. The first indication information is used to indicate the first frequency domain position of the resource block in the first resource block set. For example, the first indication information directly indicates the first frequency domain position, and does not need to indicate the second frequency domain position of the resource block in the second resource block set, and does not need to indicate a shift value for the first frequency domain position in the first resource block set that is obtained after a cyclic shift is performed on the second frequency domain position.

The first indication information may be sent to the terminal device by using uplink scheduling grant information.

Specifically, the uplink scheduling grant information is sent to the terminal device by using a physical downlink control channel (PDCCH) or an enhanced physical downlink control channel (EPDCCH).

The first indication information may indicate that any resource block set in a resource block set group is the second resource block set, and indicate the first frequency domain position of the resource block in the first resource block set that is determined based on the second frequency domain position of the resource block in the second resource block set. The terminal device determines the target resource in M basic resource units based on the first frequency domain position of the resource block in the first resource block set.

Alternatively, the first indication information may indicate the first frequency domain position of the resource block in the first resource block set. The terminal device determines the target resource in M basic resource units based on the first frequency domain position of the resource block in the first resource block set.

102: The terminal device obtains the first indication information.

The terminal device obtains the first indication information by obtaining the uplink scheduling grant sent by the access network device.

103: The terminal device determines the target resource based on the first indication information, and sends uplink data on the target resource.

The target resource includes a resource block in the M basic resource units that is allocated to the terminal device; a position of an allocated resource block in each of the M basic resource units corresponds to the first frequency domain position of the resource block in the first resource block set; and the first frequency domain position of the resource block in the first resource block set is a frequency domain position obtained after the second frequency domain position of the resource block in the second resource block set is shifted. Optionally, the shift may be a cyclic shift. This is not specifically limited.

104: The access network device receives, on the target resource corresponding to the first indication information, the uplink data sent by the terminal device.

After the access network device sends the first indication information to the terminal device, correspondingly, the access network device receives, on the target resource corresponding to the first indication information, the uplink data sent by the terminal device.

Meanings of and mutual relationships between a basic resource unit, the target resource, the first resource block set, the second resource block set, and the first indication information are separately described below.

1. Basic Resource Unit $N_{RB}^{UL}$ resource blocks carried on an unlicensed spectrum resource are grouped into N basic resource units. For example, a total quantity $N_{RB}^{UL}$ of resource blocks carried on the unlicensed spectrum resource is 100, 10 basic resource units are obtained through grouping, and each basic resource unit includes 10 resource blocks. Quantities of resource blocks included in the basic resource units may be different. For example, if the total quantity $N_{RB}^{UL}$ of resource blocks carried on the unlicensed spectrum resource is 75, eight basic resource units are obtained through grouping, where a quantity of resource blocks included in each of seven basic resource units is 10, and a quantity of resource blocks included in the other basic resource unit is 5. A same quantity of basic resource units into which the resource blocks carried on the unlicensed spectrum resource are grouped and same resource blocks included in each basic resource unit are preset by the access network device and the terminal device.

2. Target Resource

The target resource allocated by the access network device to the terminal device for sending data may be distributed in each of the M basic resource units, where M may be equal to N or may be less than N. To be specific, a resource allocated by the access network device to the terminal device for sending data may be distributed in some or all of the basic resource units. This is not limited in the present invention.

The target resource includes the resource block in the M basic resource units that is allocated to the terminal device; the position of the allocated resource block in each of the M basic resource units corresponds to the first frequency domain position of the resource block in the first resource block set; and the first frequency domain position of the resource block in the first resource block set is the frequency domain position obtained after the cyclic shift is performed on the second frequency domain position of the resource block in the second resource block set.

A frequency domain position of any resource block in the first resource block set corresponds to frequency domain positions of M resource blocks; and the M resource blocks include resources that are in the M basic resource units and whose frequency domain positions are the same as the frequency domain position of the any resource block, where each of the M basic resource units has one resource block. To be specific, the target resource includes the resource block that is in each of the M basic resource units and that corresponds to the frequency domain position of each resource block in the first resource block set. One resource block in the first resource block set corresponds to the M resource blocks. The M resource blocks are resource blocks in the M basic resource units. The M resource blocks have same relative positions in respective basic resource units, and have same positions as the resource block in the first resource block set. For details, refer to FIG. 2A and FIG. 2B.

To be specific, the target resource includes a resource block corresponding to the frequency domain position of each resource block in the first resource block set, and the target resource satisfies: a resource block corresponding to a frequency domain position $f_k$ of a $k^{th}$ resource block in the first resource block set is a resource block that is in each of the M basic resource units and whose frequency domain position is $f_k$. When a limiting condition for power spectrum density is satisfied, transmit power of the terminal device is improved.

Figure 2A:
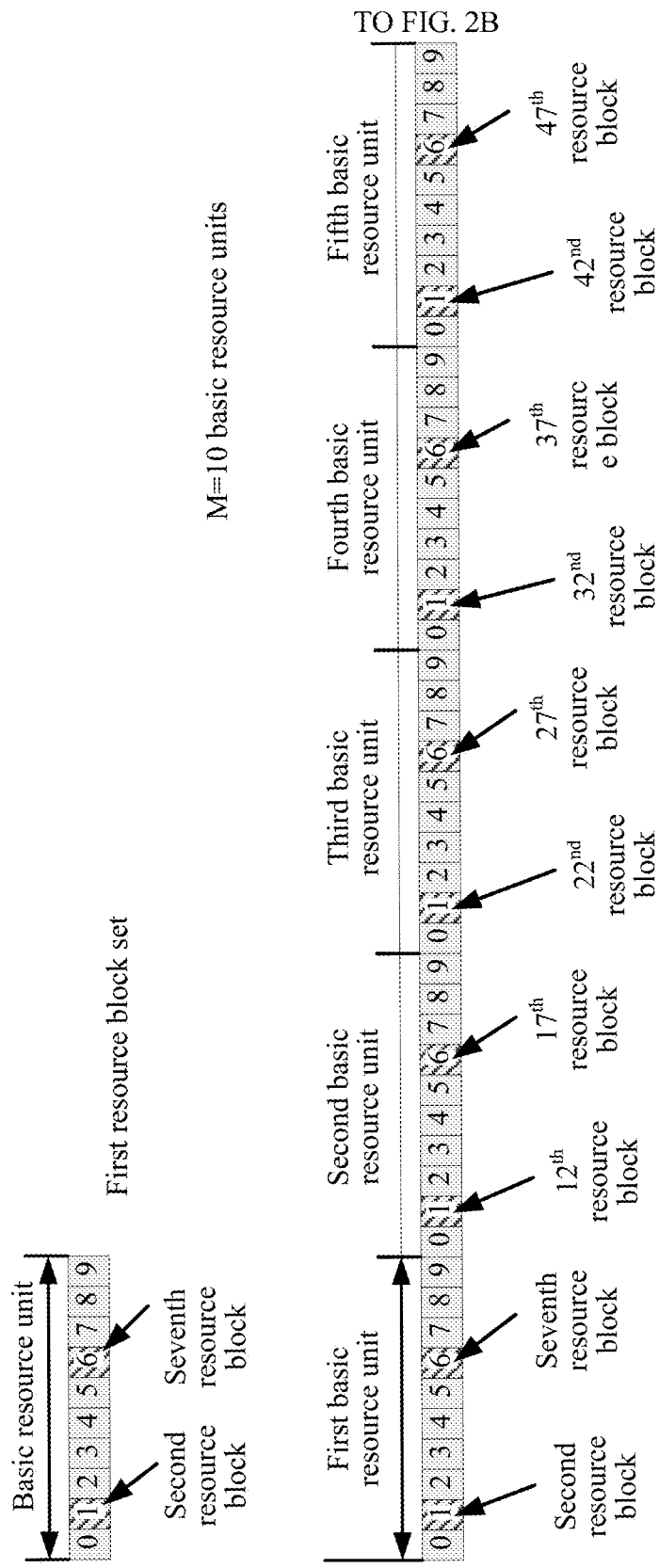
FIG. 2A and FIG. 2B are a schematic diagram of a correspondence between a target resource and a first resource block set according to an embodiment of the present invention.
Figure 2B:
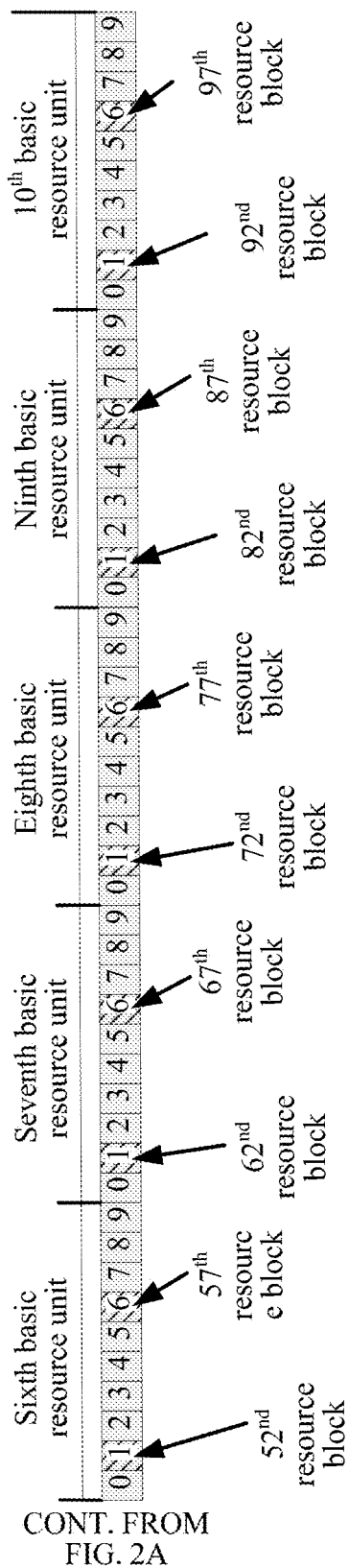

For example, FIG. 2A and FIG. 2B are a schematic diagram of a possible implementation of a correspondence between the target resource and the first resource block set. It is assumed that the target resource includes resource blocks that are in M=10 basic resource units and that are allocated to the terminal device, and a position of an allocated resource block in each of the 10 basic resource units corresponds to the first frequency domain position of the resource block in the first resource block set. Herein, it is assumed that first frequency domain positions of resource blocks in the first resource block are second and seventh resource blocks in one basic resource unit. Therefore, the target resource is second and seventh resource blocks in each of the 10 basic resource units. From a perspective of sorting the resource blocks included in the target resource in frequency domain, the resource blocks included in the target resource are second, seventh, $12^{th}$, $17^{th}$, $22^{nd}$, $27^{th}$, $32^{nd}$, $37^{th}$, $42^{nd}$, $47^{th}$, $52^{nd}$, $57^{th}$, $62^{nd}$, $67^{th}$, $72^{nd}$, $77^{th}$, $82^{nd}$, $87^{th}$, $92^{nd}$, and $97^{th}$ resource blocks.

In this way, the target resource includes a resource block that is in each of the M basic resource units and that is allocated to the terminal device. In the M basic resource units, a third frequency domain position $f_k$ is a frequency domain position of any resource block that is in a $k^{th}$ basic resource unit and that is allocated to the terminal device, a fourth frequency domain position $f_j$ corresponding to the third frequency domain position is $f_k+K^*(j-k)$, and the fourth frequency domain position is a frequency domain position of a resource block that is in a $j^{th}$ basic resource unit and that is allocated to the terminal device, where k, j, and M are all positive integers, M≥2, and k≤j≤M. The terminal device determines positions of the M resource blocks based on a position of one resource block in the first resource block set, without requiring the access network device to indicate the position of the allocated resource block in each of the M basic resource units to the terminal device, thereby improving efficiency of indicating information by the access network device.

Alternatively, the target resource may satisfy: resource blocks corresponding to the frequency domain position $f_k$ of the $k^{th}$ resource block in the first resource block set are M resource blocks; and an $m^{th}$ resource block in the M resource blocks is a resource block whose frequency domain position is $(f_k+\Delta_m)$ mod K in an $m^{th}$ basic resource unit of the M basic resource units. $\Delta_m$ is a resource mapping reference value corresponding to the $m^{th}$ basic resource unit, and herein 1≤m≤M. A value of $\Delta_m$ is a "resource mapping reference value" of the $m^{th}$ basic resource unit that is determined by the access network device and the terminal device according to a preset rule. Each of the M basic resource units has a preset and corresponding "resource mapping reference value". K is a quantity of resource blocks included in one basic resource unit. When a limiting condition for power spectrum density is satisfied, transmit power of the terminal device is improved.

For example, it is assumed that the target resource includes resource blocks that are in M=10 basic resource units and that are allocated to the terminal device, and a position of an allocated resource block in each of the 10 basic resource units corresponds to the first frequency domain position of the resource block in the first resource block set. Herein, it is assumed that first frequency domain positions of resource blocks in the first resource block are first, second, third, sixth, and seventh resource blocks in one basic resource unit. If $\Delta_m$ of the 10 basic resource units is successively 0, 1, 3, 6, 5, 3, 7, 0, 2, and 5, the target resource is second and seventh resource blocks in each of the 10 basic resource units. From a perspective of an ascending order of resource blocks included in the target resource in frequency domain, the resource blocks included in the target resource are first, second, third, sixth, seventh, $12^{th}$, $13^{th}$, $14^{th}$, $17^{th}$, $18^{th}$, $24^{th}$, $25^{th}$, $26^{th}$, $29^{th}$, $30^{th}$, $32^{nd}$, $33^{rd}$, $37^{th}$, $38^{th}$, $39^{th}$, $41^{st}$, $42^{nd}$, $46^{th}$, $47^{th}$, $48^{th}$, $54^{th}$, $55^{th}$, $56^{th}$, $59^{th}$, $60^{th}$, $63^{rd}$, $64^{th}$, $68^{th}$, $69^{th}$, $70^{th}$, $71^{st}$, $72^{nd}$, $73^{rd}$, $76^{th}$, $77^{th}$, $83^{rd}$, $84^{th}$, $85^{th}$, $88^{th}$, $89^{th}$, $91^{st}$, $92^{nd}$, $96^{th}$, $97^{th}$, and $98^{th}$ resource blocks in the 10 basic resource units.

3. First Resource Block Set

The first resource block set is a set of resource blocks in one basic resource unit that are allocated to the terminal device. An allocated resource block in each of the M basic resource units may be determined with reference to the first resource block set. Specifically, the first resource block set satisfies one of the following:

a. A frequency domain position of an $x^{th}$ resource block in the first resource block set corresponds to frequency domain positions of M resource blocks; and the M resource blocks include resource blocks that are in the M basic resource units and whose frequency domain positions are the same as the frequency domain position of the $x^{th}$ resource block, where each of the M basic resource units has one resource block, x is a positive integer, 1<x≤K, and K is a quantity of resource blocks included in one basic resource unit.

b. A frequency domain position of a $k^{th}$ resource block in the first resource block set corresponds to frequency domain positions of M resource blocks; and an $m^{th}$ resource block corresponding to the frequency domain position $f_k$ of the $k^{th}$ resource block in the first resource block set is a resource block whose frequency domain position is $(f_k+\Delta_m)$ in an $m^{th}$ basic resource unit in the M basic resource units, where $\Delta_m$ is a resource mapping reference value corresponding to the $m^{th}$ basic resource unit, k and m are both positive integers, $\Delta_m$ is an integer, 1<k≤K, 1<m≤K, and K is a quantity of resource blocks included in one basic resource unit.

Optionally, when $(f_k+\Delta_m)>K$, a resource block corresponding to the frequency domain position $f_k$ of the $k^{th}$ resource block in the first resource block set is a resource block that is in the $m^{th}$ basic resource unit, and is a resource block corresponding to a frequency domain position obtained after a cyclic shift is performed on the frequency domain position $(f_k+\Delta_m)$ in the $M^{th}$ basic resource unit.

The first frequency domain position of the resource block in the first resource block set is a frequency domain position obtained after the cyclic shift is performed on the second frequency domain position of the resource block in the second resource block set.

Specifically, a frequency domain position of a $t^{th}$ resource block in the first resource block set corresponds to a $U_1^{th}$ resource block in one basic resource unit; a frequency domain position of a $t^{th}$ resource block in the second resource block set corresponds to a $U_2^{th}$ resource block in the $i^{th}$ basic resource unit; and it is satisfied that $U^1$=mod(t1,K) and $U_2$=mod($U_1$+T,K) where T is a shift value of the cyclic shift, K is a quantity of resource blocks included in one basic resource unit, and t1, t2, $U_2$, and T are positive integers greater than 0.

Figure 3:
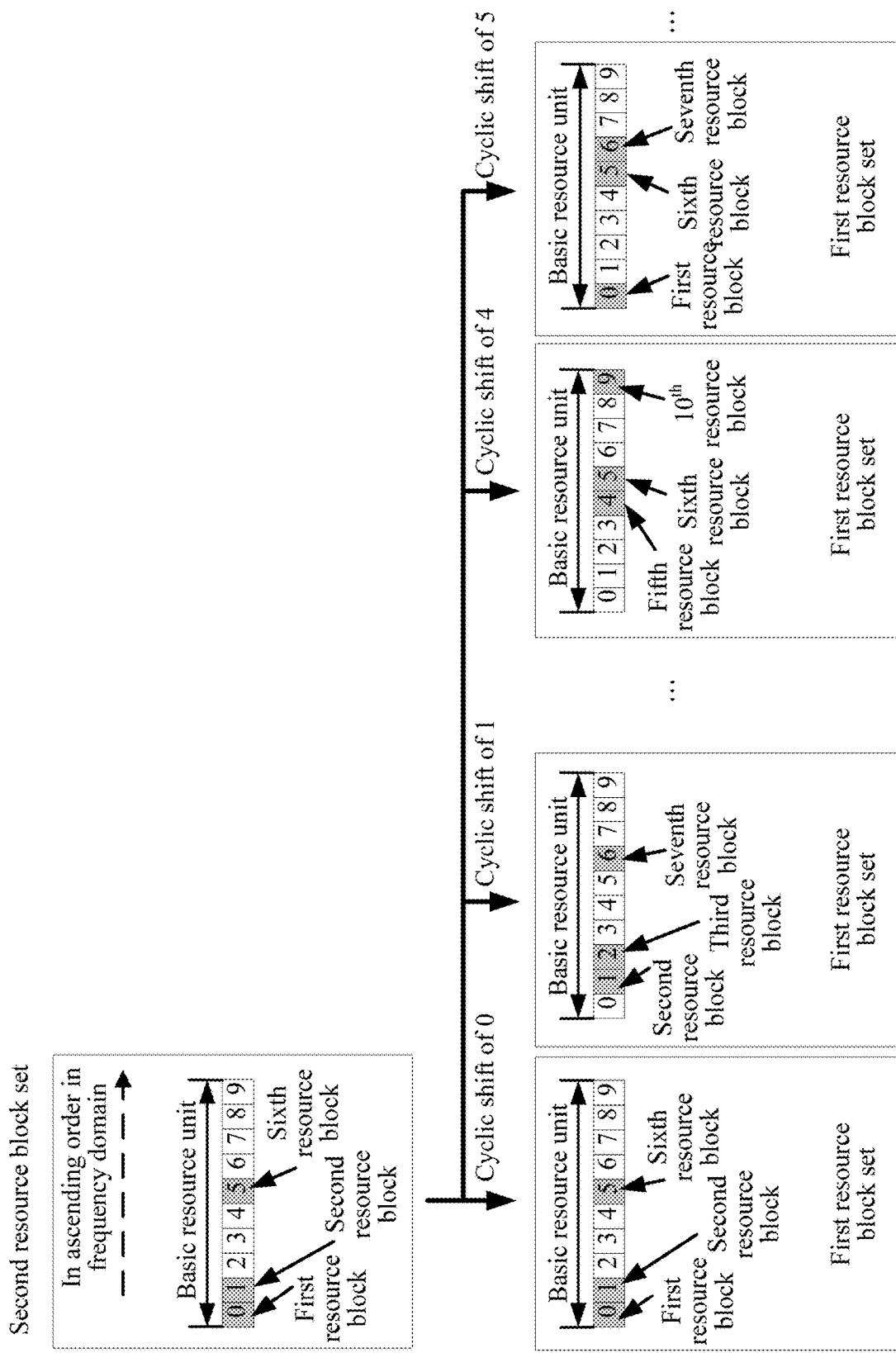
FIG. 3 is a schematic diagram of a relationship between cyclic shifts of frequency domain positions of resource blocks included in a first resource block set and a second resource block set according to an embodiment of the present invention.

For example, FIG. 3 is a schematic diagram of a relationship between cyclic shifts of frequency domain positions of resource blocks included in the first resource block set and the second resource block set. For example, a direction of an arrow "→" is a direction of a cyclic shift in ascending order in frequency domain. It is assumed that second frequency domain positions of resource blocks included in the second resource block set are first, second, and sixth resource blocks in one basic resource unit. Cyclic shifts of 0, 1, 2, 3, 4, and 5 are separately used as an example below to describe first frequency domain positions of resource blocks in the first resource block set that are obtained after the cyclic shifts are performed on the second frequency domain position of the resource block in the second resource block set:

after a cyclic shift of 0 is performed, obtained first frequency domain positions are first, second and sixth resource blocks in one basic resource unit;

after a cyclic shift of 1 is performed, obtained first frequency domain positions are second, third, and seventh resource blocks in one basic resource unit;

after a cyclic shift of 2 is performed, obtained first frequency domain positions are third, fourth, and eighth resource blocks in one basic resource unit;

after a cyclic shift of 3 is performed, obtained first frequency domain positions are fourth, fifth, and ninth resource blocks in one basic resource unit;

after a cyclic shift of 4 is performed, obtained first frequency domain positions are fifth, sixth, and $10^{th}$ resource blocks in one basic resource unit;

after a cyclic shift of 5 is performed, obtained first frequency domain positions are first, sixth, and seventh resource blocks in one basic resource unit;

after a cyclic shift of 6 is performed, obtained first frequency domain positions are second, seventh, and eighth resource blocks in one basic resource unit;

after a cyclic shift of 7 is performed, obtained first frequency domain positions are third, eighth, and ninth resource blocks in one basic resource unit; and after a cyclic shift of 8 is performed, obtained first frequency domain positions are fourth, ninth, and $10^{th}$ resource blocks in one basic resource unit.

To be specific, if different cyclic shifts are performed on the second frequency domain positions of the resource blocks in the second resource block set, different first frequency domain positions of the resource blocks in the first resource block set may be obtained. FIG. 3 shows first frequency domain positions of the first resource block set that are obtained by using an example in which cyclic shifts of 0, 1, 4, and 5 are performed on the second frequency domain positions of the resource blocks in the second resource block set. Herein, a unit of the cyclic shift is one resource block, and a cyclic shift is performed in one basic resource unit in ascending order in frequency domain. A result obtained by a cyclic shift of 0 or n*K is the same as a result obtained when no cyclic shift is performed. A shift value Y of the cyclic shift is an integer in [0, K−1], and K is a quantity of resource blocks included in one basic resource unit.

3. Second Resource Block Set

The second resource block set is a resource block set in the reference resource block set group.

The access network device indicates a resource block set in the reference resource block set to the terminal device by using the first indication information. Therefore, the terminal device may obtain the second frequency domain position of the resource block in the second resource block set. The terminal device may determine the first frequency domain position of the resource block in the first resource block set based on the second frequency domain position of the resource block in the second resource block set and a shift value of the cyclic shift that is indicated by using the first indication information, and the terminal device further determines, based on the first frequency domain position of the resource block in the first resource block set, the position of the allocated resource block in each of the M basic resource units, to form the target resource, and sends the uplink data on the target resource.

The access network device indicates the second frequency domain position of the resource block in the second resource block set by using the first indication information, or indicates the first frequency domain position of the resource block in the first resource block set by using the first indication information. To be specific, the access network device only needs to indicate a second frequency domain position that is of a resource block in the second resource block set and that corresponds to a position of an allocated resource block in one basic resource unit, or indicate, to the terminal device, the first frequency domain position of the resource block in the first resource block set, so that the terminal device can calculate the position of the allocated resource block in each basic resource unit according to the preset rule. In this way, calculation steps to be performed by the terminal device are effectively reduced, accuracy of determining a resource position is improved, and power consumption of the terminal device is reduced to some extent.

Optionally, the access network device may determine an effective shift value based on a quantity $O_1$ of resource blocks in the second resource block set, to determine whether the shift value needs to be carried in the first indication information. Details are as follows:

When the quantity $O_1$ of resource blocks in the second resource block set satisfies $$O_1 \geq \frac{K}{2} + 1,$$

there is only one shift value of a cyclic shift corresponding to the second resource block set; and/or when the quantity $O_1$ of resource blocks in the second resource block set is an odd number, there is only one shift value of a cyclic shift corresponding to the second resource block set, where $O_1$ is a positive integer, and K is a quantity of resource blocks included in one basic resource unit.

5. Reference Resource Block Set Group

The reference resource block set group includes at least one resource block set. The resource block set in the reference resource block set group is a candidate resource block set of the second resource block set corresponding to the target resource that is allocated by the access network device to the terminal device for sending the uplink data.

The reference resource block set group includes at least a first-type resource block set and a second-type resource block set.

1. The first-type resource block set satisfies the following features:

(1) The first-type resource block set includes L resource block groups; the resource block group includes one resource block or includes at least two resource blocks that are adjacent to each other in frequency domain; and the L resource block groups are non-adjacent to each other in frequency domain;

a frequency domain position of a first resource block in a V1$^{th}$ resource block group in the L resource block groups corresponds to a $$\left(\frac{K(V1-1)}{L}+1\right)^{th}$$

resource block in one basic resource unit, where 1≤V1≤P1; and a frequency domain position of a first resource block in a V2$^{th}$ resource block group in the L resource block groups corresponds to a $$\left(\frac{K(V2-1)}{L}+2\right)^{th}$$

resource block in one basic resource unit, where P1+1≤V2≤L.

Herein, the "first resource block" is a first resource block in frequency domain in ascending order in frequency domain.

(2) In ascending order in frequency domain, a quantity of resource blocks included in each of the first P1 resource block groups in the L resource block groups is M1, and a quantity of resource blocks included in each of the last P2 resource block groups in the L resource block groups is M2, where $M_1 > M_2$, and M1 and M2 are both positive integers; and L, P1, P2, V1, V2, and K are all positive integers, L≥2, P1≥1, P2=L−P1, and K is a quantity of resource blocks included in one basic resource unit.

The quantities of resource blocks included in the L resource block groups are made to be the same as far as possible, so that a peak-to-average ratio of uplink information sent by the terminal device can be as low as possible, thereby improving sending efficiency of the terminal device.

Particularly, when $M_3 - M_4 = 1$, a difference between the quantities of resource blocks included in the L resource block groups is minimized, so that allowed maximum transmit power of sending by the terminal device is not limited by a resource block group including a relatively large quantity of resource blocks. When the terminal device sends the uplink data, transmit power on each resource block is the same. If the quantities of resource blocks included in the L resource block groups are different, allowed maximum uplink transmit power of the terminal device is limited by a resource block group including a largest quantity of resource blocks.

For example, if L=2, and quantities of resource blocks included in the two resource block groups are respectively 4 and 2, a limitation is imposed by maximum transmit power spectrum density in an unlicensed spectrum. For example, in the unlicensed spectrum, maximum transmit power within each MHz needs to be lower than or equal to 10 dBm. If the two resource block groups are within different bandwidths of 1 MHz, maximum transmit power on four resource blocks in a first resource block group is 10 dBm, and maximum transmit power on two resource blocks in a second resource block group is 10 dBm. Therefore, from a perspective of transmit power on each resource block, allowed maximum transmit power on the resource block in the first resource block group is less than allowed maximum transmit power on the resource block in the second resource block group. To ensure that transmit power of sending by the terminal device on each resource block is the same, maximum transmit power of the terminal device is limited by allowed maximum transmit power of sending on each resource block in the first resource block group. Therefore, the quantities of resource blocks included in the L resource block groups should be the same as far as possible. However, if a total quantity of resource blocks included in the L resource block groups cannot be divided exactly by L, a quantity of resource blocks included in each of the first P1 resource block groups in the L resource block groups may be M1, and a quantity of resource blocks included in each of the last P2 resource block groups in the L resource block groups may be M2. To be specific, the quantities of resource blocks included in the L resource block groups are made to be the same as far as possible.

Figure 4:
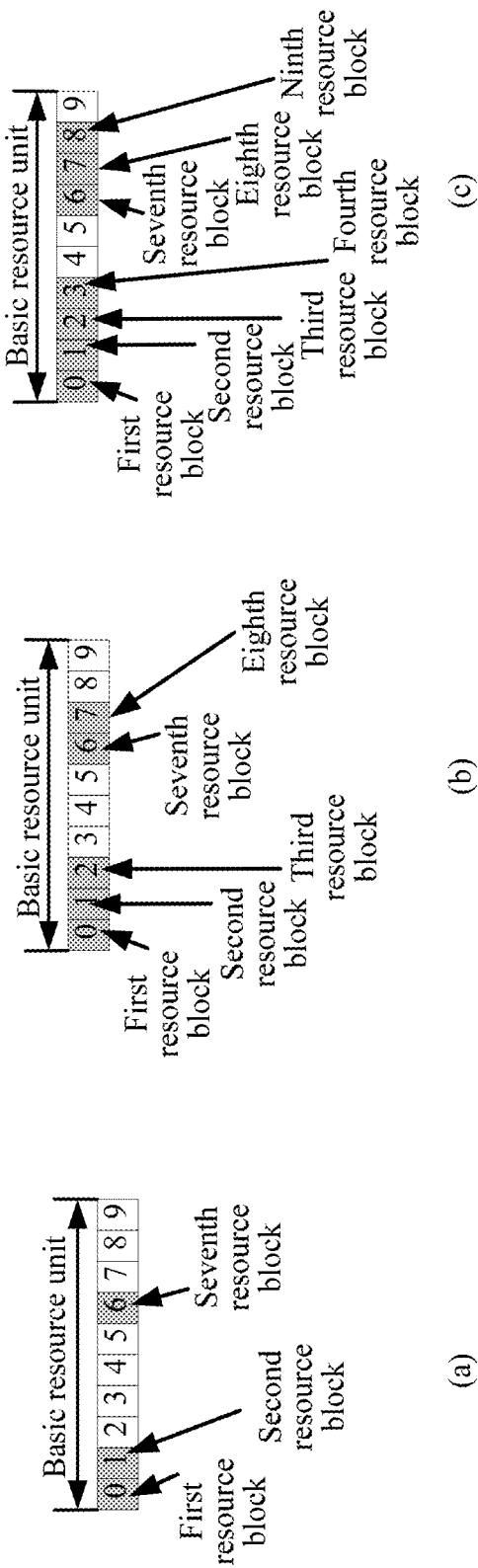
FIG. 4 is a distribution diagram of resource blocks in a first-type resource block set according to an embodiment of the present invention.

As shown in FIG. 4, an example in which one basic resource unit includes 10 resource blocks, L=2, P1=1, and P2=1 is used for description. The first-type resource block set includes two resource block groups; and in the two resource block groups, a first resource block in a first resource block group is a first resource block in one basic resource unit, and a first resource block in a second resource block group is a seventh resource block in one basic resource unit. In ascending order in frequency domain, the first resource block group includes M1 resource blocks, and the second resource block group includes M2 resource blocks, where $M_1 > M_2$. Using that $M_1 - M_2 = 1$ as an example, the reference resource block set group may include any one or any combination of three first-type resource block sets shown in (a), (b), and (c) in FIG. 4.

Values of respective M1 and M2 of the resource block sets shown in (a), (b), and (c) in FIG. 4 are successively: $M_1 = 2$ and $M_2 = 1$; $M_1 = 3$ and $M_2 = 2$; and $M_1 = 4$ and $M_2 = 3$. To be specific, frequency domain positions of resource blocks in the resource block set shown in (a) in FIG. 4 are first, second, and seventh resource blocks in one basic resource unit; frequency domain positions of resource blocks in the resource block set shown in (b) in FIG. 4 are first, second, third, seventh, and eighth resource blocks in one basic resource unit; and frequency domain positions of resource blocks in the resource block set shown in (c) in FIG. 4 are first, second, third, fourth, seventh, eighth, and ninth resource blocks in one basic resource unit.

Optionally, in some embodiments of the present invention, if any shift value is selected for a resource block set, the L resource block groups may be dispersed. For example, for the reference resource block set shown in (a) in FIG. 4, if a cyclic shift of 9 is performed on second frequency domain positions (first, second, and seventh resource blocks) of the resource block set, corresponding frequency domain positions are first, sixth, and 10$^{th}$ resource blocks in one basic resource unit, to form three resource block groups. To be specific, dispersing of original resource block groups is caused. Therefore, to ensure that resource blocks in the L resource block groups are not dispersed after a cyclic shift is performed on the first-type resource block set, and ensure resource block allocation uniformity, when the cyclic shift is performed on the first-type resource set, a shift value T of the cyclic shift may be defined to satisfy:

T is any one in a set $[0, 1, \ldots l_1]$ or any one in a set $[l_2, l_2+1, \ldots l_3]$, where $$l_1 = \frac{K}{L} - M_2 - 1, \quad l_2 = \frac{K}{L} - 1,$$

and $l_3 = K - M_1$. For example, a shift value correspondingly supported by the resource block set shown in (a) in FIG. 4 is a value in a set [0,1,2,3] or a set [4,5,6,7,8]. A shift value correspondingly supported by the resource block set shown in (b) in FIG. 4 is any value in a set [0,1,2] or any value in a set [4,5,6,7]. A shift value correspondingly supported by the resource block set shown in (c) in FIG. 4 is any value in a set [0,1] or a set [4,5,6].

Optionally, in an optional implementation of the present invention, when the access network device indicates the first indication information to the terminal device, because there may be a relatively large quantity of optional shift values corresponding to the second resource block set, if the access network device calculates all shift values satisfying a condition and indicates all the shift values to the terminal device, load of indicating information for resource allocation to the terminal device by the access network device is increased, and load of calculating a value of a cyclic shift by the terminal device is correspondingly increased. Power consumption for calculation by the access network device and the terminal device can be reduced by using the following means:

(1) Any shift value is selected from an optional shift value set for a first-type second resource block set.

To be specific, the load of indicating information for resource allocation to the terminal device by the access network device can be reduced, and the load of calculating a value of a cyclic shift by UE can be correspondingly reduced. To be specific, power consumption of the UE is correspondingly reduced, and a processing capability of the UE is not highly required. For example, if the shift value correspondingly supported by the resource block set shown in (a) in FIG. 4 is any value in a set [0,1,2,3,4,5,6,7,8], the access network device needs to indicate, to the terminal device, a shift value (that is, a shift value in the set [0,1,2,3,4,5,6,7,8]) corresponding to current resource allocation to the terminal device; to be specific, the access network device needs to indicate, to the terminal device, information about a shift value in nine shift values used for the resource allocation.

(2) An optional shift value set is narrowed down.

An optional shift value set correspondingly supported by the resource block set is narrowed down, to reduce the load of the access network device and the terminal device. For example, the resource block set shown in (a) in FIG. 4 may support only one shift value, and correspondingly, the access network device may not need to distinguish, in the first indication information, between shift values corresponding to current resource allocation to the terminal device.

For another example, the resource block set shown in (a) in FIG. 4 may support only two shift values. Correspondingly, the access network device may only need to distinguish, in the first indication information, between two shift values corresponding to current resource allocation to the terminal device, without distinguishing between more than two shift values corresponding to the current resource allocation to the terminal device. In this way, the load of indicating information for resource allocation to the terminal device by the access network device can be reduced. Preferably, the resource block set shown in (a) in FIG. 4 may support only a shift value of 0 or support only a shift value of 4. The resource block set shown in (b) in FIG. 4 may support only a shift value of 0 or support only a shift value of 4. The resource block set shown in (c) in FIG. 4 may support only a shift value of 0 or support only a shift value of 4. Because the target resource allocated to the terminal device is distributed in the M basic resource units, narrowing down of the optional shift value set has very little impact on a frequency selective gain brought about by resource multiplexing between a plurality of terminal devices.

2. The second-type resource block set satisfies the following features (1) and (2), or satisfies the following features (3) and (4):

(1) The second-type resource block set includes L resource block groups; the resource block group includes one resource block or includes at least two resource blocks that are adjacent to each other in frequency domain; and the L resource block groups are non-adjacent to each other in frequency domain; and a frequency domain position of a first resource block in a $V3^{th}$ resource block group in the L resource block groups corresponds to a $$\left(\frac{K(V3-1)}{L} + 1\right)^{th}$$

resource block in one basic resource unit, where $1 \leq V3 \leq L$; and and K is a quantity of resource blocks included in one basic resource unit.

Herein, the "first resource block" is a first resource block in frequency domain in ascending order in frequency domain.

(2) In ascending order in frequency domain, a quantity of resource blocks included in each of the first P3 resource block groups in the L resource block groups is $M_3$, and a quantity of resource blocks included in each of the last P4 resource block groups in the L resource block groups is $M_4$, where $M_3$ and $M_4$ are both positive integers, $L \geq 2$, $P3 \geq 1$, $P4 = L - P3$, and $M_3 > M_4$.

The quantities of resource blocks included in the L resource block groups are made to be the same as far as possible, so that a peak-to-average ratio of uplink information sent by the terminal device can be as low as possible, thereby improving sending efficiency of the terminal device.

Particularly, when $M_3 - M_4 = 1$, a difference between the quantities of resource blocks included in the L resource block groups is minimized, so that allowed maximum transmit power of sending by the terminal device is not limited by a resource block group including a relatively large quantity of resource blocks. When the terminal device sends the uplink data, transmit power on each resource block is the same. If the quantities of resource blocks included in the L resource block groups are different, allowed maximum uplink transmit power of the terminal device is limited by a resource block group including a largest quantity of resource blocks.

For example, if L=2, and quantities of resource blocks included in the two resource block groups are respectively 4 and 2, a limitation is imposed by maximum transmit power spectrum density in an unlicensed spectrum. For example, in the unlicensed spectrum, maximum transmit power within each MHz needs to be lower than or equal to 10 dBm. If the two resource block groups are within different bandwidths of 1 MHz, maximum transmit power on four resource blocks in a first resource block group is 10 dBm, and maximum transmit power on two resource blocks in a second resource block group is 10 dBm. Therefore, from a perspective of transmit power on each resource block, allowed maximum transmit power on the resource block in the first resource block group is less than allowed maximum transmit power on the resource block in the second resource block group. To ensure that transmit power of sending by the terminal device on each resource block is the same, maximum transmit power of the terminal device is limited by allowed maximum transmit power of sending on each resource block in the first resource block group. Therefore, the quantities of resource blocks included in the L resource block groups should be the same as far as possible. However, if a total quantity of resource blocks included in the L resource block groups cannot be divided exactly by L, a quantity of resource blocks included in each of the first P1 resource block groups in the L resource block groups may be M1, and a quantity of resource blocks included in each of the last P2 resource block groups in the L resource block groups may be M2. To be specific, the quantities of resource blocks included in the L resource block groups are made to be the same as far as possible.

Figure 5:
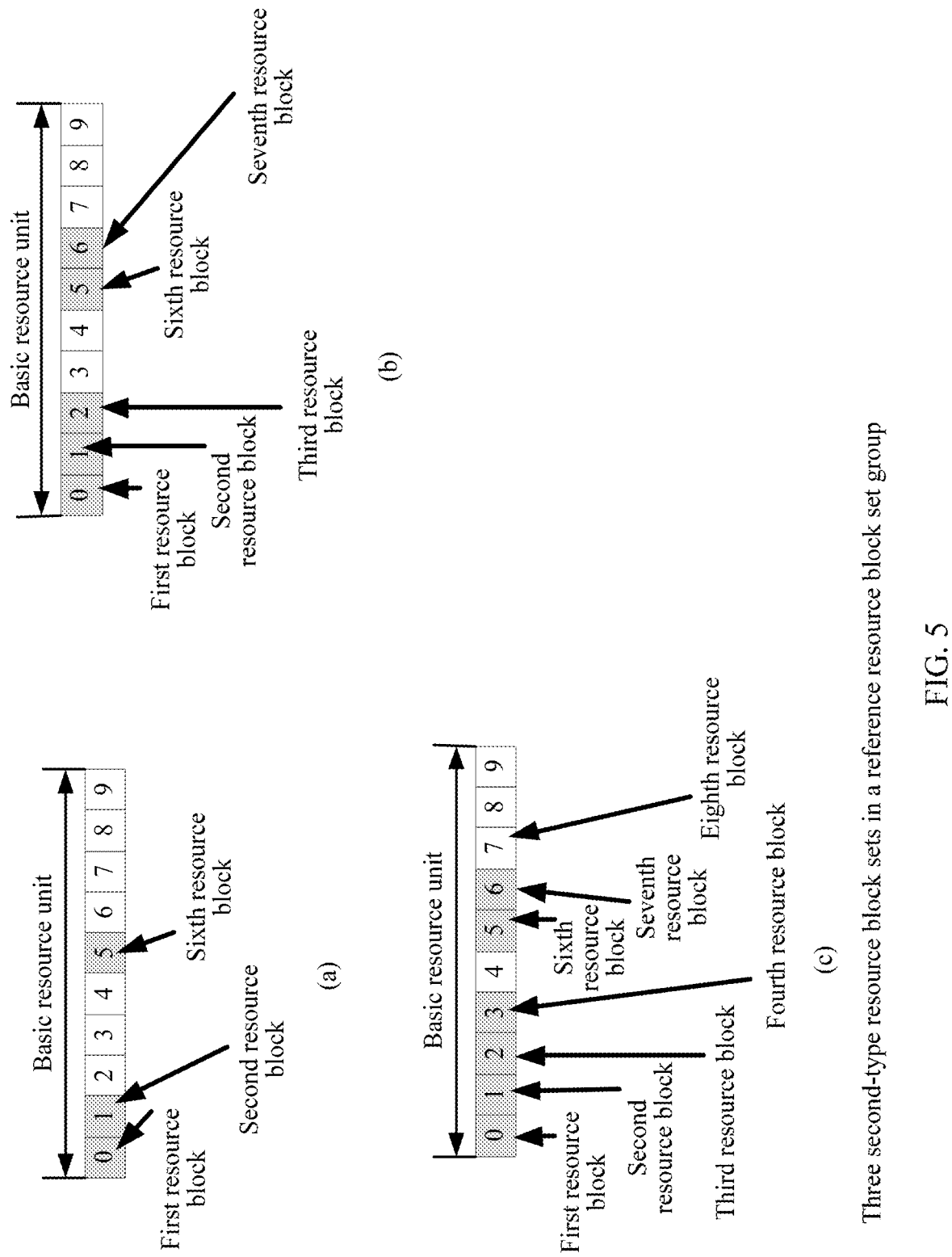
FIG. 5 is a distribution diagram of resource blocks in a second-type resource block set according to an embodiment of the present invention.

As shown in FIG. 5, an example in which one basic resource unit includes 10 resource blocks, L=2, P1=1, and P2=1 is used for description. The second-type resource block set includes two resource block groups; and in the two resource block groups, a first resource block in a first resource block group is a first resource block in one basic resource unit, and a first resource block in a second resource block group is a sixth resource block in one basic resource unit. In ascending order in frequency domain, the first resource block group in the two resource block groups includes $M_3$ resource blocks, and the second resource block group in the two resource block groups includes $M_4$ resource blocks, where $M_3>M_4$. Using that $M_3-M_4=1$ as an example, the reference resource block set group may include any one or any combination of three second-type resource block sets shown in (a), (b), and (c) in FIG. 5. Values of respective M3 and M4 of the three second-type resource block sets shown in (a), (b), and (c) in FIG. 5 are successively: $M_3=2$ and $M_4=1$; $M_33=3$ and $M_4=2$; and $M_3=4$ and $M_4=3$.

To be specific, frequency domain positions of resource blocks in the resource block set shown in (a) in FIG. 5 are first, second, and sixth resource blocks in one basic resource unit; frequency domain positions of resource blocks in the resource block set shown in (b) in FIG. 5 are first, second, third, sixth, and seventh resource blocks in one basic resource unit; and frequency domain positions of resource blocks in the resource block set shown in (c) in FIG. 5 are first, second, third, fourth, sixth, seventh, and eighth resource blocks in one basic resource unit.

Optionally, when the first resource block set is a second-type resource block set, the shift value T is any one in a set $[0,1, \ldots l_1]$ or any one in a set $[l_2, l_2+1, \ldots l_3]$, where $$l_1 = \frac{K}{L} - M_4,$$

$$l_2 = \frac{K}{L},$$

and $l_3=K-M_3$. For example, a shift value correspondingly supported by the first second-type resource block set is a value in a set [0,1,2,3] or a set [4,5,6,7,8]; a shift value correspondingly supported by the second second-type resource block set is a value in a set [0,1,2,3] or a set [5,6,7]; and a shift value correspondingly supported by the third second-type resource block set is a value in a set [0,1,2] or a set [5,6].

Optionally, in an optional implementation of the present invention, when the access network device indicates the first indication information to the terminal device, because there may be a relatively large quantity of optional shift values corresponding to the second resource block set, if the access network device calculates all shift values satisfying a condition and indicates all the shift values to the terminal device, load of indicating information for resource allocation to the terminal device by the access network device is increased, and load of calculating a shift value of a cyclic shift by the terminal device is correspondingly increased. Specific means of reducing power consumption for calculation by the access network device and the terminal device are as follows:

(1) Any shift value is selected from an optional shift value set for a second-type second resource block set.

For example, if a shift value correspondingly supported by the resource block set shown in (a) in FIG. 5 is any value in a set [0,1,2,3,4,5,6,7,8], the access network device needs to indicate, to the terminal device, a shift value (that is, a shift value in the set [0,1,2,3,4,5,6,7,8]) corresponding to current resource allocation to the terminal device; to be specific, the access network device needs to indicate, to the terminal device, information about any shift value in nine shift values used for the resource allocation.

(2) An optional shift value set is narrowed down.

An optional shift value set correspondingly supported by the resource block set is narrowed down, to reduce the load of the access network device and the terminal device. For example, the resource block set shown in (a) in FIG. 5 may support only one shift value, and correspondingly, the access network device may not need to distinguish, in the first indication information, between shift values corresponding to current resource allocation to the terminal device.

For another example, the resource block set shown in (a) in FIG. 5 may support only two shift values. Correspondingly, the access network device may only need to distinguish, in the first indication information, between two shift values corresponding to current resource allocation to the terminal device, without distinguishing between more than two shift values corresponding to the current resource allocation to the terminal device. In this way, the load of indicating information for resource allocation to the terminal device by the access network device can be reduced. Preferably, the resource block set shown in (a) in FIG. 5 may support only a shift value of 4 or support only a shift value of 8. The resource block set shown in (b) in FIG. 5 may support only a shift value of 3 or support only a shift value of 7. The resource block set shown in (c) in FIG. 5 may support only a shift value of 2 or support only a shift value of 6. Because the target resource allocated to the terminal device is distributed in the M basic resource units, narrowing down of the optional shift value set has very little impact on a frequency selective gain brought about by resource multiplexing between a plurality of terminal devices.

In addition, the second-type resource block set included in the reference resource block set group may satisfy conditions (3) and (4). Details are as follows:

(3) The second-type resource block set includes L resource block groups; the resource block group includes one resource block or includes at least two resource blocks that are adjacent to each other in frequency domain; and the L resource block groups are non-adjacent to each other in frequency domain; and a frequency domain position of a first resource block in a V3$^{th}$ resource block group in the L resource block groups corresponds to a $$\left(\frac{K(V3-1)}{L}+1\right)^{th}$$

resource block in one basic resource unit, where 1≤V3≤L; and L≥2, and K is a quantity of resource blocks included in one basic resource unit.

Herein, the "first resource block" is a first resource block in frequency domain in ascending order in frequency domain.

(4) A quantity of resource blocks included in each of the L resource block groups is $M_5$, where $M_5$ is a positive integer.

Figure 6:
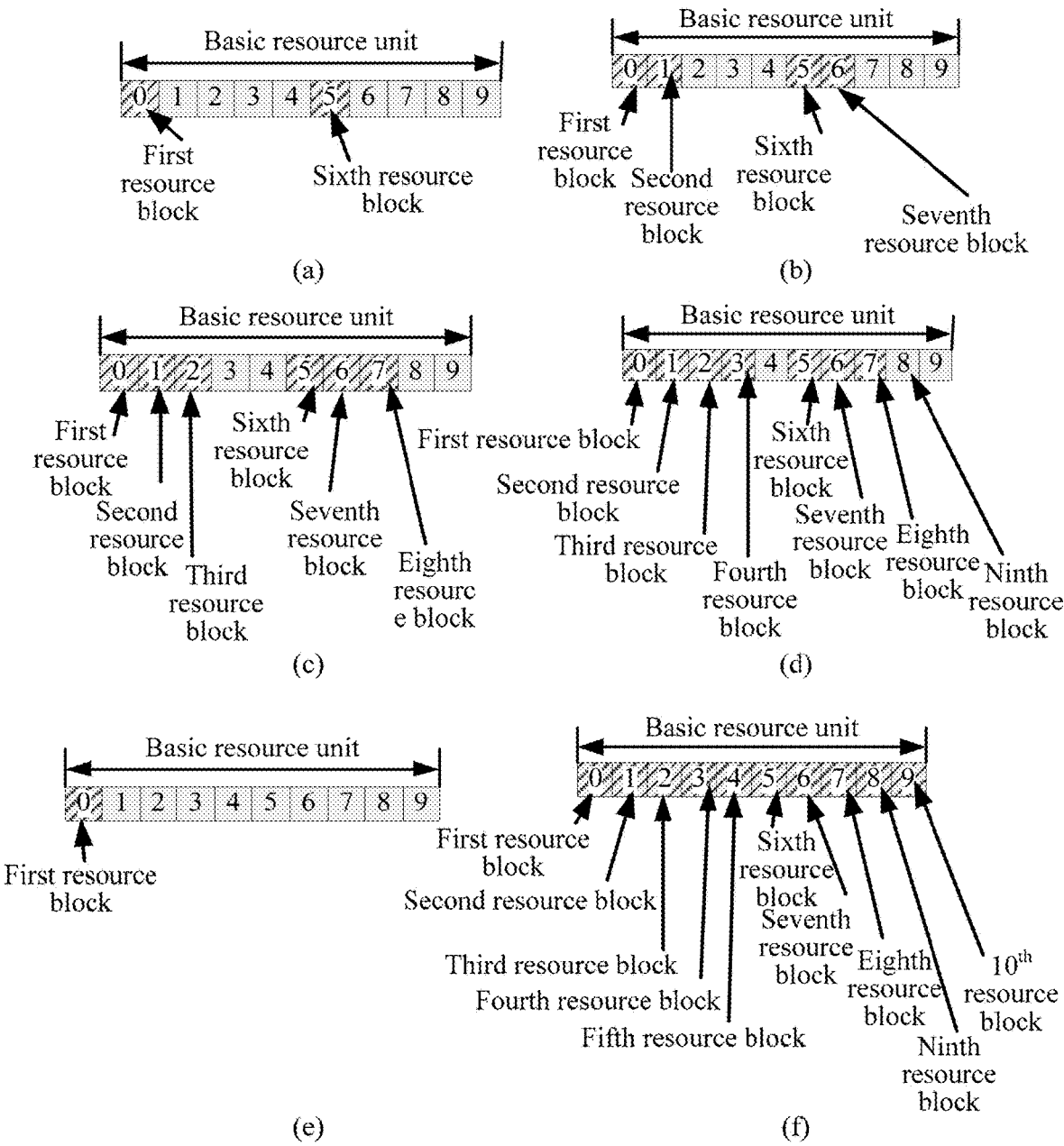
FIG. 6 is another distribution diagram of resource blocks in a second-type resource block set according to an embodiment of the present invention.

As shown in FIG. 6, an example in which one basic resource unit includes 10 resource blocks, and L=2 is used for description. The second-type resource block set includes two resource block groups; and a first resource block in a first resource block group in the two resource block groups is a first resource block in one basic resource unit, and a second resource block in a second resource block group in the two resource block groups is a sixth resource block in one basic resource unit. Each of the two resource block groups includes $M_5$ resource blocks. Using an example in which $M_5$ is 2, 4, 6, 8, or 10, the reference resource block set group may include any one or any combination of six second-type resource block sets shown in (a), (b), (c), (d), (e), and (f) in FIG. 6.

To be specific, frequency domain positions of resource blocks in the resource block set shown in (a) in FIG. 6 are first and sixth resource blocks in one basic resource unit; frequency domain positions of resource blocks in the resource block set shown in (b) in FIG. 6 are first, second, sixth, and seventh resource blocks in one basic resource unit; frequency domain positions of resource blocks in the resource block set shown in (c) in FIG. 6 are first, second, third, sixth, seventh, and eighth resource blocks in one basic resource unit; frequency domain positions of resource blocks in the resource block set shown in (d) in FIG. 6 are first, second, third, sixth, seventh, eighth, and ninth resource blocks in one basic resource unit; a frequency domain position of a resource block in the resource block set shown in (e) in FIG. 6 is a first resource block in one basic resource unit; and frequency domain positions of resource blocks in the resource block set shown in (f) in FIG. 6 are first, second, third, fourth, fifth, sixth, seventh, eighth, ninth, and 10$^{th}$ resource blocks in one basic resource unit.

Optionally, when the first resource block set is a second-type resource block set, the shift value T is any one in a set [0,1, . . . l$_1$], where $$l_1 = \frac{K}{L} - M_5.$$

For example, a shift value correspondingly supported by the reference resource block set shown in (a) in FIG. 6 is a value in a set [0,1,2,3,4]. For example, a shift value correspondingly supported by the resource block set shown in (b) in FIG. 6 is a value in a set [0,1,2,3]. For example, a shift value correspondingly supported by the reference resource block set shown in (c) in FIG. 6 is a value in a set [0,1,2]. For example, a shift value correspondingly supported by the resource block set shown in (d) in FIG. 6 is a value in a set [0,1].

Optionally, a shift value correspondingly supported by the resource block set shown in (e) in FIG. 6 is a value in a set [0,1,2,3,4,5,6,7,8,9]; and a shift value correspondingly supported by the resource block set shown in (f) in FIG. 6 is 0.

Optionally, in some implementations of the present invention, when the first resource block set is a second-type resource block set, for example, the resource block set shown in (a) in FIG. 6, if any shift value is selected for the resource block set, load of indicating information for resource allocation to the terminal device by the access network device may be caused. For example, if a correspondingly supported shift value is any value in a set [0,1,2], the access network device needs to indicate, to the terminal device, a shift value (that is, a value in the set [0,1,2]) corresponding to current resource allocation to the terminal device; to be specific, the access network device needs to indicate, to the terminal device, information about a shift value in three shift values used for the resource allocation.

If an optional shift value set correspondingly supported by the resource block set is narrowed down, the load of indicating information for resource allocation to the terminal device by the access network device can be reduced. For example, the resource block set shown in (a) in FIG. 5 may support only one shift value, and correspondingly, the access network device may indicate, in the first indication information, only a second frequency domain position that is of a resource block in the second resource block set and that corresponds to a resource allocated to the terminal device, without a need of indicating a corresponding shift value, thereby reducing load of resource calculation by the access network device and the terminal device. The resource block set shown in (a) in FIG. 6 may support only a shift value of 0, or support only a shift value of 1, or support only a shift value of 2. Because the target resource allocated to the terminal device is distributed in the M basic resource units, narrowing down of the optional shift value set has very little impact on a frequency selective gain brought about by resource multiplexing between a plurality of terminal devices.

Optionally, when a quantity $O_1$ of resource blocks in the second resource block set satisfies $$O_1 \geq \frac{K}{2} + 1,$$

there is only one shift value of a cyclic shift corresponding to the second resource block set; and/or
when a quantity $O_1$ of resource blocks in the second resource block set is an odd number, there is only one shift value of a cyclic shift corresponding to the second resource block set.

If the quantity $O_1$ of resource blocks in the second resource block set satisfies $$O_1 \geq \frac{K}{2} + 1,$$

when the access network device allocates an uplink resource to a terminal device A by using a resource allocation manner corresponding to the second resource block set, a quantity $O_2$ of resource blocks in a second resource block set used for an uplink resource allocated by the access network device to another terminal device B is definitely less than $$\frac{K}{2},$$

and the terminal device A and the terminal device B share the uplink resource in a same subframe through frequency division multiplexing. Provided that a second resource block set in which a quantity $O_2$ of resource blocks is less than $$\frac{K}{2}$$

correspondingly supports various shift values of a cyclic shift, a second resource block set in which a quantity of resource blocks is greater than $$\frac{K}{2}+1$$

may correspondingly support only one shift value of a cyclic shift.

If the quantity $O_1$ of resource blocks in the second resource block set is an odd number, the second resource block set may correspondingly support only one shift value of a cyclic shift.

Optionally, a correspondence between a second resource block set and a corresponding shift value of a cyclic shift may include at least one row in the following Table 1.

TABLE 1

| Index number of a second frequency domain position of a resource block in a second resource block set | Shift value corresponding to the second resource block set |
|---|---|
| {0} | (0, 1, 2, 3, 4, 5, 6, 7, 8, 9) |
| {0 5} | (0, 1, 2, 3, 4) |
| {0 1 5} | (8) |
| {0 1 6} | (4) |
| {0 1 5 6} | (0, 1, 2, 3) |
| {0 1 2 5 6} | (2) |
| {0 1 2 6 7} | (4) |
| {0 1 2 5 6 7} | (0) |
| {0 1 2 3 5 6 7} | (6) |
| {0 1 2 3 6 7 8} | (5) |
| {0 1 2 3 5 6 7 8} | (0) |
| {0 1 2 3 4 5 6 7 8} | (0) |
| {0 1 2 3 4 5 6 7 8 9} | (0) |

Optionally, in an optional implementation of the present invention, the access network device indicates the first indication information to the terminal device, determines the target resource based on the first indication information, and sends the uplink data on the target resource. The target resource includes the resource block in the M basic resource units that is allocated to the terminal device; the position of the allocated resource block in each of the M basic resource units corresponds to the first frequency domain position of the resource block in the first resource block set; and the first frequency domain position of the resource block in the first resource block set is the frequency domain position obtained after the second frequency domain position of the resource block in the second resource block set is shifted, where M is a positive integer.

The second resource block set and the shift value corresponding to the second resource block set satisfy at least one of the following:

for a second resource block set in which a quantity of included resource blocks is greater than 4 and less than 8, there is only one corresponding shift value;

for a second resource block set in which a quantity of included resource blocks is less than 5 and is an even number, there is more than one corresponding shift value;

for a second resource block set in which a quantity of included resource blocks is less than 8 and is an odd number, there is only one corresponding shift value;

for a second resource block set in which a quantity of included resource blocks is 3, there are Ns corresponding shift values, where $1 \leq Ns < 9$;

for a second resource block set in which a quantity of included resource blocks is 5, there are Ns corresponding shift values, where $1 \leq Ns < 7$;

for a second resource block set in which a quantity of included resource blocks is 6, there are Ns corresponding shift values, where $1 \leq Ns < 3$; and for a second resource block set in which a quantity of included resource blocks is 7, there are Ns corresponding shift values, where $1 \leq Ns < 5$.

6. First Indication Information

Each indication value of the first indication information corresponds to one resource block set in the resource block set group and one value of a cyclic shift. A mapping relationship between an indication value $I_{index}$ of the first indication information, each resource block set in the resource block set group, and a corresponding value of a cyclic shift is shown in the following Table 2. After receiving the first indication information, the terminal device may determine a second resource block set and a corresponding value of a cyclic shift based on an indication value of the first indication information and the mapping relationship, and determine a first resource block set based on the second resource block set and the corresponding value of the cyclic shift. An allocated resource block in the M basic resource units may be correspondingly determined based on a first frequency domain position of a resource block in the first resource block set, to determine the target resource.

The mapping relationship is shown in the following Table 2.

TABLE 2

| Indication value $I_{index}$ of first indication information | Second resource block set | Value of a cyclic shift |
|---|---|---|
| $0$ to $v_1 - 1$ | a | $I_{index}$ |
| $v_1$ to $\sum_{q=1}^{2} v_q - 1$ | b | $I_{index} - \sum_{q=1}^{1} v_q$ |
| $\sum_{q=1}^{2} v_q$ to $\sum_{q=1}^{3} v_q - 1$ | c | $I_{index} - \sum_{q=1}^{2} v_q$ |
| $\sum_{q=1}^{3} v_q$ to $\sum_{q=1}^{4} v_q - 1$ | d | $I_{index} - \sum_{q=1}^{3} v_q$ |
| $\sum_{q=1}^{4} v_q$ to $\sum_{q=1}^{5} v_q - 1$ | e | $I_{index} - \sum_{q=1}^{4} v_q$ |

TABLE 2-continued

| Indication value $I_{index}$ of first indication information | Second resource block set | Value of a cyclic shift |
|---|---|---|
| $\sum_{q=1}^{5} v_q$ to $\sum_{q=1}^{6} v_q - 1$ | f | $I_{index} - \sum_{q=1}^{5} v_q$ |
| $\sum_{q=1}^{6} v_q$ to $\sum_{q=1}^{7} v_q - 1$ | g | $I_{index} - \sum_{q=1}^{6} v_q$ |
| $\sum_{q=1}^{7} v_q$ to $\sum_{q=1}^{8} v_q - 1$ | h | $I_{index} - \sum_{q=1}^{7} v_q$ |
| $\sum_{q=1}^{8} v_q$ to $\sum_{q=1}^{9} v_q - 1$ | i | $I_{index} - \sum_{q=1}^{8} v_q$ |
| $\sum_{q=1}^{9} v_q$ to $\sum_{q=1}^{10} v_q - 1$ | j | $I_{index} - \sum_{q=1}^{9} v_q$ |

In Table 2, the resource block sets a to j are resource block sets included in the resource block set group, and first frequency domain positions of resource blocks included in the resource block sets a to j are different. $v_1$, $v_2$, $v_3$, $v_4$, $v_5$, $v_6$, $v_7$, $v_8$, and $v_9$ are successively quantities of supported values of a cyclic shift when the resource block sets b to j each are a second resource block set.

Optionally, for one of the resource block sets a to j, if the resource block set correspondingly supports only one shift value, the first indication information indicates only the second frequency domain position of the resource block in the second resource block set, and does not need to indicate the shift value corresponding to the resource block set. It should be noted that, a shift value corresponding to a second frequency domain position of a resource block in such a type of second resource block set is predefined by the access network device and the terminal device, and therefore, does not need to be indicated by using the first indication information.

Optionally, for one of the resource block sets a to j, if the resource block set correspondingly supports only one shift value, the first indication information may indicate a frequency domain position after a cyclic shift is performed on the second frequency domain position of the resource block in the second resource block set, that is, the first frequency domain position of the resource block in the first resource block set.

Table 1 is merely an example for describing the correspondence between the indication value $I_{index}$ of the first indication information, each resource block set in the resource block set group, and the corresponding value of the cyclic shift. The table of the mapping relationship may vary based on a quantity of resource block sets included in the resource block set group and a quantity of cyclic shifts supported by the resource block sets. The mapping relationship is preconfigured for both the access network device and the terminal device.

An example in which the reference resource block set group in this embodiment of the present invention includes the three first-type resource block sets shown in FIG. 4, the three second-type resource block sets shown in FIG. 5, and the six second-type resource block sets shown in FIG. 6 is used. The correspondence between the indication value $I_{index}$ of the first indication information, each resource block set in the resource block set group, and the corresponding value of the cyclic shift is shown in the following Table 3.

TABLE 3

| Indication value $I_{index}$ of first indication information | Second frequency domain position of a resource block in a second resource block set (an index of a resource block in one basic resource unit) | Value of a cyclic shift |
|---|---|---|
| 0 to 9 | {0} | $I_{index}{}^{th}$ value in [0, 1, 2, 3, 4, 5, 6, 7, 8, 9] |
| 10 to 14 | {0 5} | $I_{index} - 10^{th}$ value in [0, 1, 2, 3, 4] |
| 15 to 23 | {0 1 5} | $I_{index} - 15^{th}$ value in [0, 1, 2, 3, 4, 5, 6, 7, 8] |
| 24 to 32 | {0 1 6} | $I_{index} - 24^{th}$ value in [0, 1, 2, 3, 4, 5, 6, 7, 8] |
| 33 to 36 | {0 1 5 6} | $I_{index} - 33^{th}$ value in [0, 1, 2, 3] |
| 37 to 43 | {0 1 2 5 6} | $I_{index} - 37^{th}$ value in [0, 1, 2, 3, 5, 6, 7] |
| 44 to 50 | {0 1 2 6 7} | $I_{index} - 44^{th}$ value in [0, 1, 2, 4, 5, 6, 7] |
| 51 to 53 | {0 1 2 5 6 7} | $I_{index} - 51^{th}$ value in [0, 1, 2] |
| 54 to 58 | {0 1 2 3 5 6 7} | $I_{index} - 54^{th}$ value in [0, 1, 2, 5, 6] |
| 59 to 63 | {0 1 2 3 6 7 8} | $I_{index} - 59^{th}$ value in [0, 1, 4, 5, 6] |
| 64 to 65 | {0 1 2 3 5 6 7 8} | $I_{index} - 64^{th}$ value in [0, 1] |
| 66 to 67 | {0 1 2 3 4 5 6 7 8} | $I_{index} - 66^{th}$ value in [0, 1] |
| 68 | {0 1 2 3 4 5 6 7 8 9} | 0 |

{0}, {0 5}, . . . , and the like in a second column in Table 3 are index numbers, and "0", "1", . . . , and "9" in the resource block set shown in (a) in FIG. 5 indicate index numbers, and successively indicate a first resource block, a second resource block, . . . , and a $10^{th}$ resource block in one basic resource unit. It may be understood that, the mapping relationship is preconfigured on both an access network device side and a terminal device side. Therefore, the access network device indicates a position of the allocated target resource to the terminal device, so that the terminal device determines, based on the preset mapping relationship, the target resource for sending the uplink data, and the access network device receives, on the target resource, the uplink data sent by the corresponding terminal device.

It should be noted that, the correspondence between the indication value $I_{index}$ of the first indication information, each resource block set in the resource block set group, and the corresponding value of the cyclic shift may be information indicated by some rows in Table 2. For example, when the second frequency domain position of the resource block in the second resource block set (an index of a resource block in one basic resource unit) does not include 7, the correspondence between the indication value $I_{index}$ of the first indication information, each resource block set in the resource block set group, and the corresponding value of the cyclic shift does not include the following two rows in Table 3.

| | | |
|---|---|---|
| 54 to 58 | {0 1 2 3 5 6 7} | $I_{index}$ − 54$^{th}$ value in [0, 1, 2, 5, 6] |
| 59 to 63 | {0 1 2 3 6 7 8} | $I_{index}$ − 59$^{th}$ value in [0, 1, 4, 5, 6] |

Correspondingly, values of $I_{index}$ in other rows behind the two rows are successively decreased by 10, as shown in the following Table 4.

TABLE 4

| Indication value $I_{index}$ of first indication information | Second frequency domain position of a resource block in a second resource block set (an index of a resource block in one basic resource unit) | Value of a cyclic shift |
|---|---|---|
| 0 to 9 | {0} | $I_{index}$$^{th}$ value in [0, 1, 2, 3, 4, 5, 6, 7, 8, 9] |
| 10 to 14 | {0 5} | $I_{index}$ − 10$^{th}$ value in [0, 1, 2, 3, 4] |
| 15 to 23 | {0 1 5} | $I_{index}$ − 15$^{th}$ value in [0, 1, 2, 3, 4, 5, 6, 7, 8] |
| 24 to 32 | {0 1 6} | $I_{index}$ − 24$^{th}$ value in [0, 1, 2, 3, 4, 5, 6, 7, 8] |
| 33 to 36 | {0 1 5 6} | $I_{index}$ − 33$^{th}$ value in [0, 1, 2, 3] |
| 37 to 43 | {0 1 2 5 6} | $I_{index}$ − 37$^{th}$ value in [0, 1, 2, 3, 5, 6, 7] |
| 44 to 50 | {0 1 2 6 7} | $I_{index}$ − 44$^{th}$ value in [0, 1, 2, 4, 5, 6, 7] |
| 51 to 53 | {0 1 2 5 6 7} | $I_{index}$ − 51$^{th}$ value in [0, 1, 2] |
| 54 to 58 | {0 1 2 3 5 6 7} | $I_{index}$ − 54$^{th}$ value in [0, 1, 2, 5, 6] |
| 59 to 63 | {0 1 2 3 6 7 8} | $I_{index}$ − 59$^{th}$ value in [0, 1, 4, 5, 6] |
| 54 to 55 | {0 1 2 3 5 6 7 8} | $I_{index}$ − 54$^{th}$ value in [0, 1] |
| 56 to 57 | {0 1 2 3 4 5 6 7 8} | $I_{index}$ − 56$^{th}$ value in [0, 1] |
| 58 | {0 1 2 3 4 5 6 7 8 9} | 0 |

For another example, the correspondence between the indication value $I_{index}$ of the first indication information, each resource block set in the resource block set group, and the corresponding value of the cyclic shift is shown in Table 3. It should be noted that, the correspondence between the indication value $I_{index}$ of the first indication information, each resource block set in the resource block set group, and the corresponding value of the cyclic shift may be information indicated by some rows in Table 5.

TABLE 5

| Indication value $I_{index}$ of first indication information | Second frequency domain position of a resource block in a second resource block set (an index of a resource block in one basic resource unit) | Value of a cyclic shift |
|---|---|---|
| 0 to 9 | {0} | $I_{index}$$^{th}$ value in [0, 1, 2, 3, 4, 5, 6, 7, 8, 9] |
| 10 to 14 | {0 5} | $I_{index}$ − 10$^{th}$ value in [0, 1, 2, 3, 4] |
| 15 | {0 1 5} | 4 (or 8) |
| 16 | {0 1 6} | 0 (or 4) |
| 17 to 20 | {0 1 5 6} | $I_{index}$ − 33$^{th}$ value in [0, 1, 2, 3] |
| 21 | {0 1 2 5 6} | 3 (or 7) |
| 22 | {0 1 2 6 7} | 0 (or 4) |
| 23 | {0 1 2 5 6 7} | 0 (or 1, or 2) |
| 24 | {0 1 2 3 5 6 7} | 2 (or 6) |
| 25 | {0 1 2 3 6 7 8} | 0 (or 4) |
| 26 | {0 1 2 3 5 6 7 8} | 0 (or 1) |
| 27 | {0 1 2 3 4 5 6 7 8} | 0 (or 1) |
| 28 | {0 1 2 3 4 5 6 7 8 9} | 0 |

Optionally, the indication value of the first indication information corresponds to information about the first frequency domain position of the resource block in the first resource block set. An index that is of a resource block in one basic resource unit and that is for the first frequency domain position of the resource block in the first resource block set is one of the following options:

if there is one resource block in the first resource block set, an index that is of a resource block in one basic resource unit and that is for a first frequency domain position of the resource block in the first resource block set is one of {0}, {1}, {2}, {3}, {4}, {5}, {6}, {7}, {8}, and {9};

if there are two resource blocks in the first resource block set, an index that is of a resource block in one basic resource unit and that is for first frequency domain positions of the resource blocks in the first resource block set is one of {0 5}, {1 6}, {2 7}, {3 8}, and {4 9};

if there are three resource blocks in the first resource block set, an index that is of a resource block in one basic resource unit and that is for first frequency domain positions of the resource blocks in the first resource block set is one of {0 1 6} and {4 5 9}; or if there are three resource blocks in the first resource block set, an index that is of a resource block in one basic resource unit and that is for first frequency domain positions of the resource blocks in the first resource block set is one of {0 4 5} and {3 4 9};

if there are four resource blocks in the first resource block set, an index that is of a resource block in one basic resource unit and that is for first frequency domain positions of the resource blocks in the first resource block set is one of {0 1 5 6}, {1 2 6 7}, {2 3 7 8}, and {3 4 8 9};

if there are five resource blocks in the first resource block set, an index that is of a resource block in one basic resource unit and that is for first frequency domain positions of the resource blocks in the first resource block set is one of {0 1 2 6 7} and {3 4 5 8 9}; or if there are five resource blocks in the first resource block set, an index that is of a resource block in one basic resource unit and that is for first frequency domain positions of the resource blocks in the first resource block set is one of {0 1 4 5 6} and {2 3 7 8 9};

if there are six resource blocks in the first resource block set, an index that is of a resource block in one basic resource unit and that is for first frequency domain positions of the resource blocks in the first resource block set is {0 1 2 5 6 7}; or if there are six resource blocks in the first resource block set, an index that is of a resource block in one basic resource unit and that is for first frequency domain positions of the resource blocks in the first resource block set is {2 3 4 6 7 8}; or if there are six resource blocks in the first resource block set, an index that is of a resource block in one basic resource unit and that is for first frequency domain positions of the resource blocks in the first resource block set is {3 4 5 7 8 9};

if there are seven resource blocks in the first resource block set, an index that is of a resource block in one basic resource unit and that is for first frequency domain positions of the resource blocks in the first resource block set is one of {0 1 2 3 6 7 8} and {2 3 4 5 7 8 9}; or if there are seven resource blocks in the first resource block set, an index that is of a resource block in one basic resource unit and that is for first frequency domain positions of the resource blocks in the first resource block set is one of {0 1 2 4 5 6 7} and {1 2 3 6 7 8 9};

if there are eight resource blocks in the first resource block set, an index that is of a resource block in one basic resource unit and that is for first frequency domain positions of the resource blocks in the first resource block set is {0 1 2 3 5 6 7 8}; or if there are eight resource blocks in the first resource block set, an index that is of a resource block in one basic resource unit and that is for first frequency domain positions of the resource blocks in the first resource block set is {1 2 3 4 6 7 8 9};

if there are nine resource blocks in the first resource block set, an index that is of a resource block in one basic resource unit and that is for first frequency domain positions of the resource blocks in the first resource block set is {0 1 2 3 4 5 6 7 8}; or if there are nine resource blocks in the first resource block set, an index that is of a resource block in one basic resource unit and that is for first frequency domain positions of the resource blocks in the first resource block set is {1 2 3 4 5 6 7 8 9}; and if there are 10 resource blocks in the first resource block set, an index that is of a resource block in one basic resource unit and that is for first frequency domain positions of the resource blocks in the first resource block set is {0 1 2 3 4 5 6 7 8 9}.

For example, a correspondence between the indication value $I_{index}$ of the first indication information and the first resource block set may be shown in Table 6.

TABLE 6

| Indication value $I_{index}$ of first indication information | First frequency domain position of a resource block in a first resource block set | Remarks |
| --- | --- | --- |
| 0 | {0} | |
| 1 | {1} | |
| 2 | {2} | |
| 3 | {3} | |
| 4 | {4} | |
| 5 | {5} | |
| 6 | {6} | |
| 7 | {7} | |
| 8 | {8} | |
| 9 | {9} | |
| 10 | {0 5} | |
| 11 | {1 6} | |
| 12 | {2 7} | |
| 13 | {3 8} | |
| 14 | {4 9} | |
| 15 | {0 1 6} | or {0 4 5} |
| 16 | {4 5 9} | or {3 8 9} |
| 17 | {0 1 5 6} | |
| 18 | {1 2 6 7} | |
| 19 | {2 3 7 8} | |
| 20 | {3 4 8 9} | |
| 21 | {0 1 2 6 7} | or {0 1 4 5 6} |
| 22 | {3 4 5 8 9} | or {2 3 7 8 9} |
| 23 | {0 1 2 5 6 7} | or {2 3 4 6 7 8} |
| | | or {3 4 5 7 8 9} |
| 24 | {0 1 2 3 6 7 8} | or {0 1 2 4 5 6 7} |
| 25 | {2 3 4 5 7 8 9} | or {1 2 3 6 7 8 9} |
| 26 | {0 1 2 3 5 6 7 8} | or {1 2 3 4 6 7 8 9} |
| 27 | {0 1 2 3 4 5 6 7 8} | or {1 2 3 4 5 6 7 8 9} |
| 28 | {0 1 2 3 4 5 6 7 8 9} | |

Optionally, in some embodiments of the present invention, when allocating a resource to at least two terminal devices, the access network device may allocate a resource block in one basic resource unit to the at least two terminal devices, thereby implementing frequency division multiplexing between a plurality of terminal devices and improving resource utilization. The access network device may indicate that a second resource block set of at least one terminal device is a first-type resource block set in the reference resource block set group, and indicate that a second resource block set of at least one other terminal device is a second-type resource block set in the reference resource block set group, to ensure non-overlapping between resource blocks of the terminal devices, and allocate as many resource blocks as possible in the entire basic resource unit to the terminal device for sending uplink data, thereby implementing frequency division multiplexing of a resource between the plurality of terminal devices. The access network device may indicate allocated resource blocks to the at least two terminal devices by respectively using the first-type resource block set and the second-type resource block set, and allocate uplink resource blocks to the plurality of terminal devices, thereby implementing frequency division multiplexing. An example in which the access network device already allocates a first resource block set in one basic resource unit to a first terminal device, and allocates another resource block set in the basic resource unit to a second terminal device is used for description below.

The access network device indicates the first-type resource block set in the reference resource block set group as a second resource block set to the first terminal device, and indicates the second-type resource block set that is in the reference resource block set group and that is shown in (c) in FIG. 5 as a second resource block set to the second terminal device below.

Figure 7:
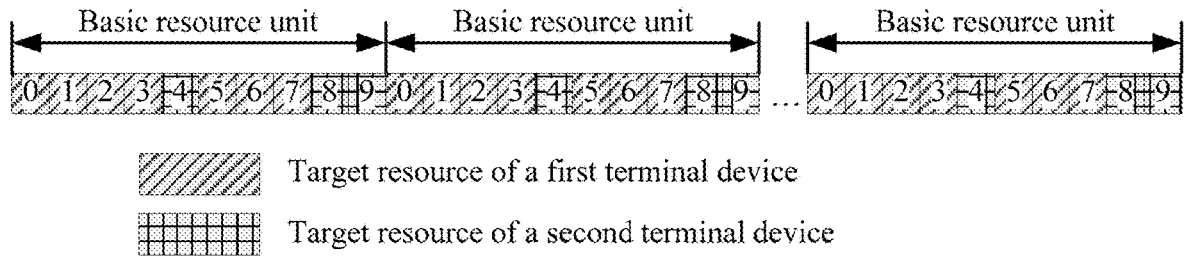
FIG. 7 is a resource block distribution diagram of resource blocks that are in a basic resource unit and that are allocated to two terminal devices according to an embodiment of the present invention.

For example, it is assumed that the access network device indicates, to the first terminal device by using the first indication information, that a cyclic shift corresponding to the second resource block set is 0. As shown in FIG. 7, the first terminal device may determine the allocated target resource according to the method in this embodiment. When the access network device allocates the target resource (resource blocks 0, 1, 2, 3, 5, 6, and 7) shown in the figure to the first terminal device, if the access network device indicates the second-type resource block set that is in the reference resource block set group and that is shown in (e) in FIG. 6 as the second resource block set to the second terminal device, the access network device can allocate a ninth resource block (the index number 8 in Table 2) in each of the M basic resource units to the second terminal device for sending uplink data; otherwise, the ninth resource block in each of the M basic resource units cannot be allocated to another terminal device. Therefore, to allocate a remaining resource block to the second terminal device, on the precondition that the first-type resource block set as the second resource block set is indicated to the first terminal device, the access network device may indicate the second-type resource block set (for example, the resource block set shown in (c) in FIG. 5) as the second resource block set to the second terminal device.

For another example, the access network device indicates the second-type resource block set shown in (a) in FIG. 4 as the second resource block set to the second terminal device, and the access network device indicates, to the second terminal device by using the first indication information, that a value of a cyclic shift corresponding to the second resource block set is 8. In this way, the second terminal device may determine the allocated target resource according to the method in this embodiment. The ninth resource block in each of the M basic resource units is effectively allocated to the second terminal device. The access network device respectively indicates different types of resource block sets in the reference resource block set group to different terminal devices, thereby implementing effective frequency division multiplexing of a resource between a plurality of terminal devices.

The resource allocation indication method in the present invention has been described above, and an access network device and a terminal device that perform the resource allocation indication method are described below. On a device side, for meanings of and mutual relationships between a reference resource set group, a basic resource unit, a target resource, a first resource block set, a second resource block set, and first indication information, refer to descriptions in the method embodiment in the embodiments of the present invention, and details are not described herein again.

Figure 8:
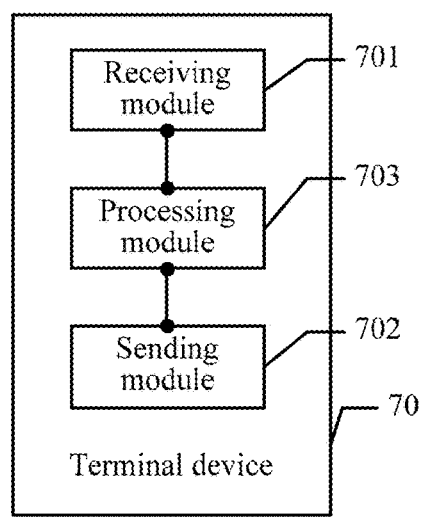
FIG. 8 is a schematic structural diagram of a terminal device 70 according to an embodiment of the present invention.

1. Referring to FIG. 8, a terminal device 70 is described. The terminal device 70 includes:

a receiving module 701, configured to obtain first indication information; and a processing module 702, configured to: determine a target resource based on the first indication information received by the receiving module 701, and send uplink data on the target resource.

The target resource includes a resource block in M basic resource units that is allocated to the terminal device; a position of an allocated resource block in each of the M basic resource units corresponds to a first frequency domain position of a resource block in a first resource block set; the first frequency domain position of the resource block in the first resource block set is a frequency domain position obtained after a cyclic shift is performed on a second frequency domain position of a resource block in a second resource block set, where M is a positive integer; and the M basic resource units are arranged in ascending order in frequency domain. For a relationship between the first resource block set and the M basic resource units, refer to related descriptions of the foregoing method embodiment, and details are not described herein again.

The first indication information is used to indicate the second frequency domain position of the resource block in the second resource block set and a shift value T of the cyclic shift.

Optionally, the first resource block set satisfies:

a frequency domain position of an $x^{th}$ resource block in the first resource block set corresponds to frequency domain positions of M resource blocks; and the M resource blocks include resource blocks that are in the M basic resource units and whose frequency domain positions are the same as the frequency domain position of the $x^{th}$ resource block, where each of the M basic resource units has one resource block, x is a positive integer, $1 < x \le K$, and K is a quantity of resource blocks included in one basic resource unit.

Therefore, the target resource includes a resource block corresponding to a frequency domain position of each resource block in the first resource block set, and a resource block corresponding to a frequency domain position $f_k$ of a $k^{th}$ resource block in the first resource block set is a resource block that is in each of the M basic resource units and whose frequency domain position is $f_k$.

Optionally, in some embodiments of the present invention, the second resource block set is a first-type resource block set in a reference resource block set group. For a feature of the first-type resource block set (for example, L resource block groups and a shift value T1), refer to corresponding descriptions in the foregoing method embodiments, and details are not described herein again.

The terminal device 70 further includes a processing module 703. An example in which a value of an index $I_{index}$ included in the first indication information is (0 to $v_1-1$) is used below to describe determining of the target resource by the terminal device 70. Details are as follows:

The processing module 703 may obtain, based on the mapping relationship shown in Table 1 or Table 2 in the foregoing method embodiment, that a type of a corresponding resource block set whose $I_{index}$ is (0 to $v_1-1$) is the resource block set shown in (c) in FIG. 6, and obtain a shift value $I_{index}$ of a cyclic shift on a resource block in a resource block set shown in (c) in FIG. 6; and then, perform a cyclic shift on resource blocks included in the resource block set shown in (c) in FIG. 6, and separately calculate frequency domain positions corresponding to resource blocks that are in the 10 basic resource units and that are allocated to the terminal device, to obtain the target resource for sending the uplink data.

Optionally, in some embodiments of the present invention, the second resource block set is a second-type resource block set in the reference resource block set group. For a feature of the second-type resource block set (for example, L resource block groups and a shift value T), refer to corresponding descriptions in the foregoing method embodiments, and details are not described herein again. If some resource blocks in the M basic resource units are already allocated to another terminal device, the access network device determines a type of a matching resource block set based on a remaining resource block, and then notifies the terminal device 70 by using indication information, so that the terminal device 70 may determine a type of the resource block set based on content in the indication information, and then obtain an allocated resource, thereby implementing frequency division multiplexing with the another terminal device.

Figure 9:
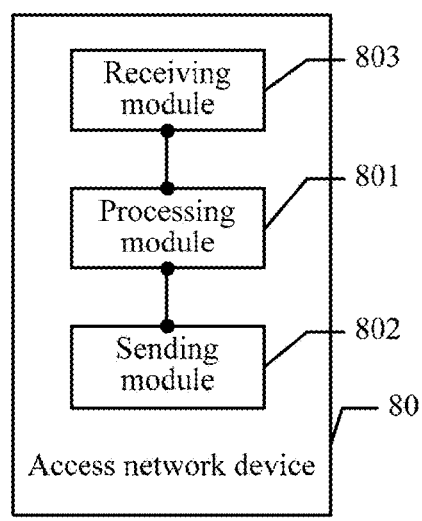
FIG. 9 is a schematic structural diagram of an access network device 80 according to an embodiment of the present invention.

2. Referring to FIG. 9 an access network device 80 is described. The access network device 80 includes:

a processing module 801, configured to determine a target resource for a terminal device;

a sending module 802, configured to send first indication information to the terminal device; and a receiving module 803, configured to receive, on a target resource corresponding to the first indication information, uplink data sent by the terminal device.

The target resource includes a resource block in M basic resource units that is allocated to the terminal device; a position of an allocated resource block in each of the M basic resource units corresponds to a first frequency domain position of a resource block in a first resource block set; the first frequency domain position of the resource block in the first resource block set is a frequency domain position obtained after a cyclic shift is performed on a second frequency domain position of a resource block in a second resource block set, where M is a positive integer; and the M basic resource units are arranged in ascending order in frequency domain.

The first indication information is used to indicate, to the terminal device, the second frequency domain position of the resource block in the second resource block set and a shift value T of the cyclic shift.

Optionally, the first resource block set satisfies:

a frequency domain position of an $x^{th}$ resource block in the first resource block set corresponds to frequency domain positions of M resource blocks; and the M resource blocks include resource blocks that are in the M basic resource units and whose frequency domain positions are the same as the frequency domain position of the $x^{th}$ resource block, where each of the M basic resource units has one resource block, x is a positive integer, $1<x\leq K$, and K is a quantity of resource blocks included in one basic resource unit.

Therefore, the target resource includes a resource block corresponding to a frequency domain position of each resource block in the first resource block set, and a resource block corresponding to a frequency domain position $f_k$ of a $k^{th}$ resource block in the first resource block set is a resource block that is in each of the M basic resource units and whose frequency domain position is $f_k$.

Optionally, in some embodiments of the present invention, when the second resource block set is a first-type resource block set in a reference resource block set group or is a first-type resource block set in a reference resource block set group, for both a feature of the first-type resource block set (for example, L resource block groups and a shift value T) and a feature of the first-type resource block set (for example, L resource block groups and a shift value T), refer to corresponding descriptions in the foregoing method embodiments, and details are not described herein again.

Optionally, in some embodiments of the present invention, considering that some resource blocks remain when resource blocks in a same basic resource unit are allocated to only one terminal device, the remaining resource blocks may be allocated to another terminal device, for example, resource blocks in the M basic resource units are allocated to a first terminal device and a second terminal device, thereby implementing frequency division multiplexing of a resource between a plurality of terminal devices. The processing module 803 is further configured to:

allocate the target resource in the M basic resource units to the second terminal device, and send corresponding second indication information to the second terminal device by using the sending module 801, where resources allocated to the first terminal device and the second terminal device are non-overlapping in frequency domain.

Optionally, the second resource block set indicated to the second terminal device by using the second indication information may be the first-type resource block set or the second-type resource block set. For a feature of the first-type resource block set or the second-type resource block set (for example, L resource block groups and a shift value T), refer to corresponding descriptions in the foregoing method embodiments, and details are not described herein again.

Figure 10:
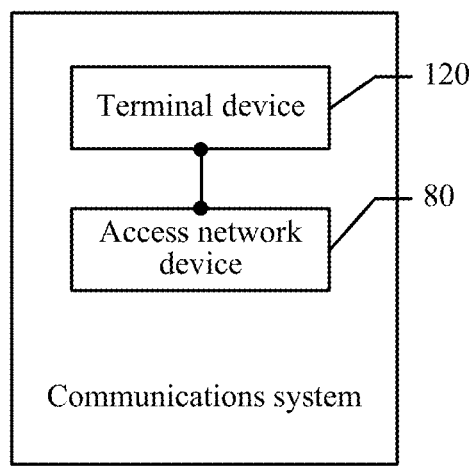
FIG. 10 is a schematic structural diagram of a communications system according to an embodiment of the present invention.

3. An embodiment of the present invention further provides a communications system. Referring to FIG. 10, the communications system includes:

the terminal device 70 shown in FIG. 7; and the access network device 80 shown in FIG. 8.

Figure 11:
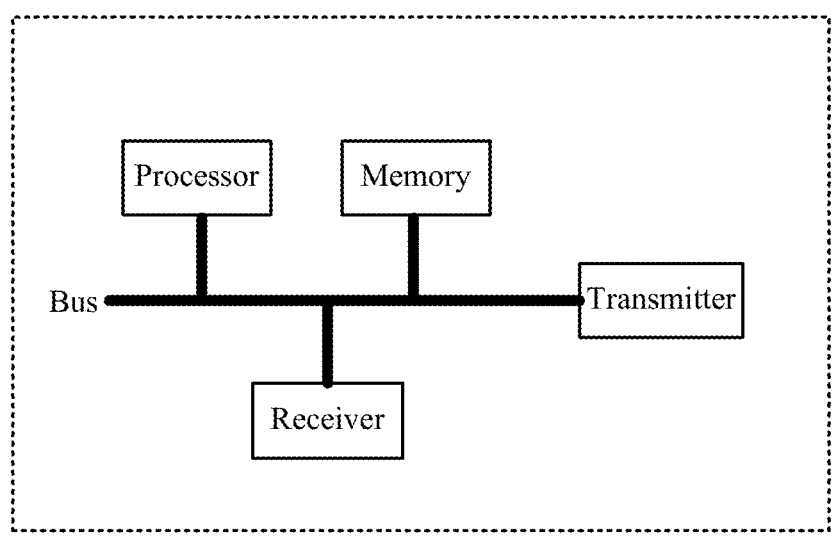
FIG. 11 is a schematic structural diagram of a physical apparatus performing a resource allocation indication method according to an embodiment of the present invention.

It should be noted that, in the embodiments (including the embodiments shown in FIG. 7 and FIG. 8) of the present invention, all physical devices corresponding to the receiving modules may be receivers, all physical devices corresponding to the sending modules may be transmitters, and all physical devices corresponding to the processing modules may be processors. The apparatuses shown in FIG. 7 and FIG. 8 may both have a structure shown in FIG. 11. When one of the apparatuses has the structure shown in FIG. 11, a processor, a transmitter, and a receiver in FIG. 11 implement same or similar functions of the processing module, the sending module, and the receiving module provided in the apparatus embodiment corresponding to the apparatus. The memory in FIG. 11 stores program code that needs to be invoked by the processor when the processor performs the foregoing method for downloading a signed file.

The present invention further provides a computer storage medium. The medium stores a program, and when the program is executed, some or all of the steps of the foregoing resource allocation indication method performed by the terminal device 70 or the access network device 80 are included.

For example, a structure of the terminal device 70 in this specification includes a processor, a receiver, and a transmitter. The processor is configured to support performing a corresponding function in the foregoing method by the terminal device 70. The receiver and the transmitter are configured to: support communication between the terminal device 70 and the access network device 80, and send information or an instruction used in the foregoing method to the access network device 80. The terminal device 70 may further include a memory. The memory is configured to couple with the processor, and stores program code and data required by an operator server. This is similar to the access network device 80, and details are not described again.

In the foregoing embodiments, the descriptions of the embodiments have respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the conventional art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The technical solutions provided in the embodiments of the present invention are described in detail above. Specific examples are used for description of the principles and implementations of the present invention. The description of these embodiments is used to help understand the method and core ideas of the present invention. A person of ordinary skill in the art can make various modifications and variations to the present invention in terms of specific implementations and application scopes. The content of this specification should not be construed as a limitation to the present invention.

What is claimed is:

1. A resource allocation indication method comprising:
obtaining, by a terminal device, first indication information; and
determining, by the terminal device, a target resource based on the first indication information, and sending uplink data on the target resource, wherein
the target resource comprises a resource block, which is allocated to the terminal device, in M basic resource units on an unlicensed spectrum resource; a position of an allocated resource block in each of the M basic resource units corresponds to a first frequency domain position of a resource block in a first resource block set; a frequency domain position of an $x^{th}$ resource block in the first resource block set corresponds to frequency domain positions of M resource blocks; and the M resource blocks comprise resource blocks that are in the M basic resource units and whose frequency domain positions are the same as the frequency domain position of the $x^{th}$ resource block, wherein each of the M basic resource units has one resource block; and the first frequency domain position of the resource block in the first resource block set is a frequency domain position obtained after a second frequency domain position of a resource block in a second resource block set is shifted, and wherein M is a positive integer, M≥2, x is a positive integer, 1<x≤K, and K is a quantity of resource blocks comprised in one basic resource unit.

2. The method according to claim 1, wherein the unlicensed spectrum resource comprises $N_{RB}^{UL}$ resource blocks and the $N_{RB}^{UL}$ resource blocks are grouped into the M basic resource units.

3. The method according to claim 2, $N_{RB}^{UL}$ is 100, M is 10.

4. The method according to claim 1, wherein the shift of the second frequency domain position is a cyclic shift, and the first indication information satisfies one of the following:
(a) the first indication information indicates the second frequency domain position of the resource block in the second resource block set and a shift value T of the cyclic shift, wherein T is an integer; and
(b) the first indication information indicates the first frequency domain position of the resource block in the first resource block set.

5. The method according to claim 1, wherein an index of the second frequency domain position belongs to {0,5}, and a shift value associated with the second resource block set belongs to {0, 1, 2, 3, 4}.

6. A resource allocation indication method comprising:
sending, by an access network device, first indication information to a terminal device; and
receiving, by the access network device on a target resource associated with the first indication information, uplink data sent by the terminal device, wherein
the target resource comprises a resource block, which is allocated to the terminal device, in M basic resource units on an unlicensed spectrum resource; a position of an allocated resource block in each of the M basic resource units corresponds to a first frequency domain position of a resource block in a first resource block set; a frequency domain position of an $x^{th}$ resource block in the first resource block set corresponds to frequency domain positions of M resource blocks; and the M resource blocks comprise resource blocks that are in the M basic resource units and whose frequency domain positions are the same as the frequency domain position of the $x^{th}$ resource block, wherein each of the M basic resource units has one resource block; and the first frequency domain position of the resource block in the first resource block set is a frequency domain position obtained after a second frequency domain position of a resource block in a second resource block set is shifted, and wherein M is a positive integer, M≥2, x is a positive integer, 1<x≤K, and K is a quantity of resource blocks comprised in one basic resource unit.

7. The method according to claim 6, wherein the unlicensed spectrum resource comprises $N_{RB}^{UL}$ resource blocks and the $N_{RB}^{UL}$ resource blocks are grouped into the M basic resource units.

8. The method according to claim 7, $N_{RB}^{UL}$ is 100, M is 10.

9. The method according to claim 6, wherein the shift of the second frequency domain position is a cyclic shift, and the first indication information satisfies one of the following:
- (a) the first indication information indicates, to the terminal device, the second frequency domain position of the resource block in the second resource block set and a shift value T of the cyclic shift, wherein T is an integer; and
- (b) the first indication information indicates the first frequency domain position of the resource block in the first resource block set.

10. The method according to claim 6, wherein an index of the second frequency domain position belongs to $\{0,5\}$, and a shift value associated with the second resource block set belongs to $\{0, 1, 2, 3, 4\}$.

11. A terminal device comprising:
- a receiver, configured to cooperate with a processor to obtain first indication information;
- the processor, configured to determine a target resource based on the first indication information received by the receiver; and
- a transmitter, configured to cooperate with the processor to send uplink data on the target resource, wherein
- the target resource comprises a resource block, which is allocated to the terminal device, in M basic resource units on an unlicensed spectrum resource; a position of an allocated resource block in each of the M basic resource units corresponds to a first frequency domain position of a resource block in a first resource block set; a frequency domain position of an $x^{th}$ resource block in the first resource block set corresponds to frequency domain positions of M resource blocks; and the M resource blocks comprise resource blocks that are in the M basic resource units and whose frequency domain positions are the same as the frequency domain position of the $xt^h$ resource block, wherein each of the M basic resource units has one resource block; and the first frequency domain position of the resource block in the first resource block set is a frequency domain position obtained after a second frequency domain position of a resource block in a second resource block set is shifted, and wherein M is a positive integer, M≥2, x is a positive integer, 1<x≤K, and K is a quantity of resource blocks comprised in one basic resource unit.

12. The terminal device according to claim 11, wherein the unlicensed spectrum resource comprises $N_{RB}^{UL}$ resource blocks and the $N_{RB}^{UL}$ resource blocks are grouped into the M basic resource units.

13. The terminal device according to claim 12, $N_{RB}^{UL}$ is 100, M is 10.

14. The terminal device according to claim 11, wherein the shift of the second frequency domain position is a cyclic shift, and the first indication information satisfies one of the following:
- (a) the first indication information indicates the second frequency domain position of the resource block in the second resource block set and a shift value T of the cyclic shift; and
- (b) the first indication information indicates the first frequency domain position of the resource block in the first resource block set.

15. The terminal device according to claim 11, wherein an index of the second frequency domain position belongs to $\{0,5\}$, and a shift value associated with the second resource block set belongs to $\{0, 1, 2, 3, 4\}$.

16. An access network device comprising:
- a transmitter, configured to cooperate with a processor to send first indication information to a terminal device;
- the processor, configured to cooperate with the transmitter and a receiver; and
- a receiver, configured to cooperate with the processor to receive, on a target resource associated with the first indication information, uplink data, wherein
- the target resource comprises a resource block, which is allocated to the terminal device, in M basic resource units on an unlicensed spectrum resource; a position of an allocated resource block in each of the M basic resource units corresponds to a first frequency domain position of a resource block in a first resource block set; a frequency domain position of an $x^{th}$ resource block in the first resource block set corresponds to frequency domain positions of M resource blocks; and the M resource blocks comprise resource blocks that are in the M basic resource units and whose frequency domain positions are the same as the frequency domain position of the $x^{th}$ resource block, wherein each of the M basic resource units has one resource block; and the first frequency domain position of the resource block in the first resource block set is a frequency domain position obtained after a second frequency domain position of a resource block in a second resource block set is shifted, wherein M is a positive integer, M≥2.

17. The access network device according to claim 16, wherein the unlicensed spectrum resource comprises $N_{RB}^{UL}$ resource blocks and the $N_{RB}^{UL}$ resource blocks are grouped into the M basic resource units.

18. The access network device according to claim 17, $N_{RB}^{UL}$ is 100, M is 10.

19. The access network device according to claim 16, wherein the shift of the second frequency domain position is a cyclic shift, and the first indication information satisfies one of the following:
- (a) the first indication information indicates, to the terminal device, the second frequency domain position of the resource block in the second resource block set and a shift value T of the cyclic shift, wherein T is an integer; and
- (b) the first indication information indicates the first frequency domain position of the resource block in the first resource block set.

20. The access network device according to claim 16, wherein an index of the second frequency domain position belongs to $\{0,5\}$, and a shift value associated with the second resource block set belongs to $\{0, 1, 2, 3, 4\}$.

* * * * *